US007548246B2

(12) United States Patent
Huang et al.

(10) Patent No.: US 7,548,246 B2
(45) Date of Patent: Jun. 16, 2009

(54) SYSTEM AND METHOD FOR DEFINING A CONTROLLED DEVICE COMMAND SET

(75) Inventors: Steve LanPing Huang, Placentia, CA (US); James N. Conway, Jr., Laguna Beach, CA (US); Patrick H. Hayes, Mission Viejo, CA (US); Jeremy K. Black, Santa Ana, CA (US)

(73) Assignee: Universal Electronics, Inc., Cypress, CA (US)

(*) Notice: Subject to any disclaimer, the term of this patent is extended or adjusted under 35 U.S.C. 154(b) by 386 days.

(21) Appl. No.: 11/389,627

(22) Filed: Mar. 24, 2006

(65) Prior Publication Data

US 2007/0225828 A1 Sep. 27, 2007

(51) Int. Cl.
*G06T 15/00* (2006.01)

(52) U.S. Cl. ......................... 345/600; 700/90; 700/221; 340/5.61; 340/5.64; 340/825.72; 348/734

(58) Field of Classification Search ................ 345/600; 700/90, 221; 340/5.61, 5.64, 825.72; 348/734
See application file for complete search history.

(56) References Cited

U.S. PATENT DOCUMENTS

| | | | | |
|---|---|---|---|---|
| 4,774,511 A | | 9/1988 | Rumbolt et al. | |
| 4,959,810 A | | 9/1990 | Darbee et al. | |
| 5,226,077 A | | 7/1993 | Lynn et al. | |
| 5,414,761 A | | 5/1995 | Darbee | |
| 5,481,256 A | | 1/1996 | Darbee et al. | |
| 5,515,052 A | | 5/1996 | Darbee | |
| 5,537,463 A | | 7/1996 | Escobosa et al. | |
| 5,872,562 A | | 2/1999 | McConnell et al. | |
| 5,953,144 A | | 9/1999 | Darbee et al. | |
| 5,959,751 A | | 9/1999 | Darbee et al. | |
| 6,014,092 A | | 1/2000 | Darbee et al. | |
| 6,195,033 B1 | | 2/2001 | Darbee et al. | |
| 6,204,796 B1 | | 3/2001 | Chan et al. | |
| 6,204,846 B1 | | 3/2001 | Little et al. | |
| 6,223,348 B1 | | 4/2001 | Hayes et al. | |
| 6,225,938 B1 | | 5/2001 | Hayes et al. | |
| 6,469,751 B1 | * | 10/2002 | Isobe et al. | 348/734 |
| 6,587,067 B2 | | 7/2003 | Darbee et al. | |
| RE39,059 E | * | 4/2006 | Foster | 715/744 |
| 7,024,256 B2 | * | 4/2006 | Krzyzanowski et al. | 700/65 |
| 7,093,003 B2 | * | 8/2006 | Yuh et al. | 709/219 |
| 7,129,855 B2 | * | 10/2006 | Krzyzanowski et al. | 340/825.72 |
| RE39,716 E | * | 7/2007 | Huang et al. | 700/65 |
| 7,379,778 B2 | * | 5/2008 | Hayes et al. | 700/66 |
| 2001/0033243 A1 | | 10/2001 | Harris et al. | |
| 2003/0025840 A1 | | 2/2003 | Arling | |
| 2004/0155793 A1 | | 8/2004 | Mui | |

* cited by examiner

*Primary Examiner*—Phu K Nguyen
(74) *Attorney, Agent, or Firm*—Greenberg Traurig, LLP

(57) ABSTRACT

A system and method for configuring a controlling device to allow the controlling device to generate commands for commanding operations of a new appliance which new appliance was previously unable to be supported by the controlling device. The system and method uses a definition input into the controlling device to create a new device data set for use in generating commands to command operations of the new appliance. The new device data set is a new combination of elements selected from device data sets already stored within a memory of the controlling device.

52 Claims, 16 Drawing Sheets

940

| Hex value | Key |
|---|---|
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 0 | 0 |
| A | Vol+ |
| B | Vol- |
| C | Ch+ |
| D | Ch- |
| E | Last |
| F | Mute |

Sequence to define above example data string: 950

2,Ch-,0,8,3,Ch+,3,1,1,Mute

| Key order | Function | Desired value | Key re-mapping entry sequence | Function | Stored value |
|---|---|---|---|---|---|
| 1 | Power | 1E | Pause | Power | 5A |
| 2 | 1 | 11 | 1 | 1 | 11 |
| 3 | 2 | 12 | 2 | 2 | 12 |
| 4 | 3 | 13 | 3 | 3 | 13 |
| 5 | 4 | 14 | 4 | 4 | 14 |
| 6 | 5 | 15 | 5 | 5 | 15 |
| 7 | 6 | 16 | 6 | 6 | 16 |
| 8 | 7 | 17 | 7 | 7 | 17 |
| 9 | 8 | 18 | 8 | 8 | 18 |
| 10 | 9 | 19 | 9 | 9 | 19 |
| 11 | 0 | 10 | 0 | 0 | 10 |
| 12 | Vol + | 1A | FF | Vol + | 20 |
| 13 | Vol - | 1B | Rew | Vol - | 21 |
| 14 | Mute | 1C | Stop | Mute | 22 |
| 15 | Chan + | 20 | Vol+ | Chan + | 3A |
| 16 | Chan - | 21 | Vol- | Chan - | 3B |
| 17 | Last | 22 | Mute | Last | 3C |
| 18 | FF | | Etc.. .. .. .. | FF | 1A |
| 19 | Rew | | | Rew | 1B |
| 20 | Stop | | | Stop | 1C |
| 21 | Play | | | Play | 1D |
| 22 | Pause | | | Pause | 1E |
| 23 | Record | | | Record | 1F |
| 24 | Menu | Etc.. .. .. .. | | Menu | Etc.. .. .. .. |
| 25 | Exit | | | Exit | |
| 26 | Up | | | Up | |
| 27 | Down | | | Down | |
| 28 | Left | | | Left | |
| 29 | Right | | | Right | |
| 30 | Select | | | Select | |
| 31 | Enter | | | Enter | |

Dynamic indexing start byte

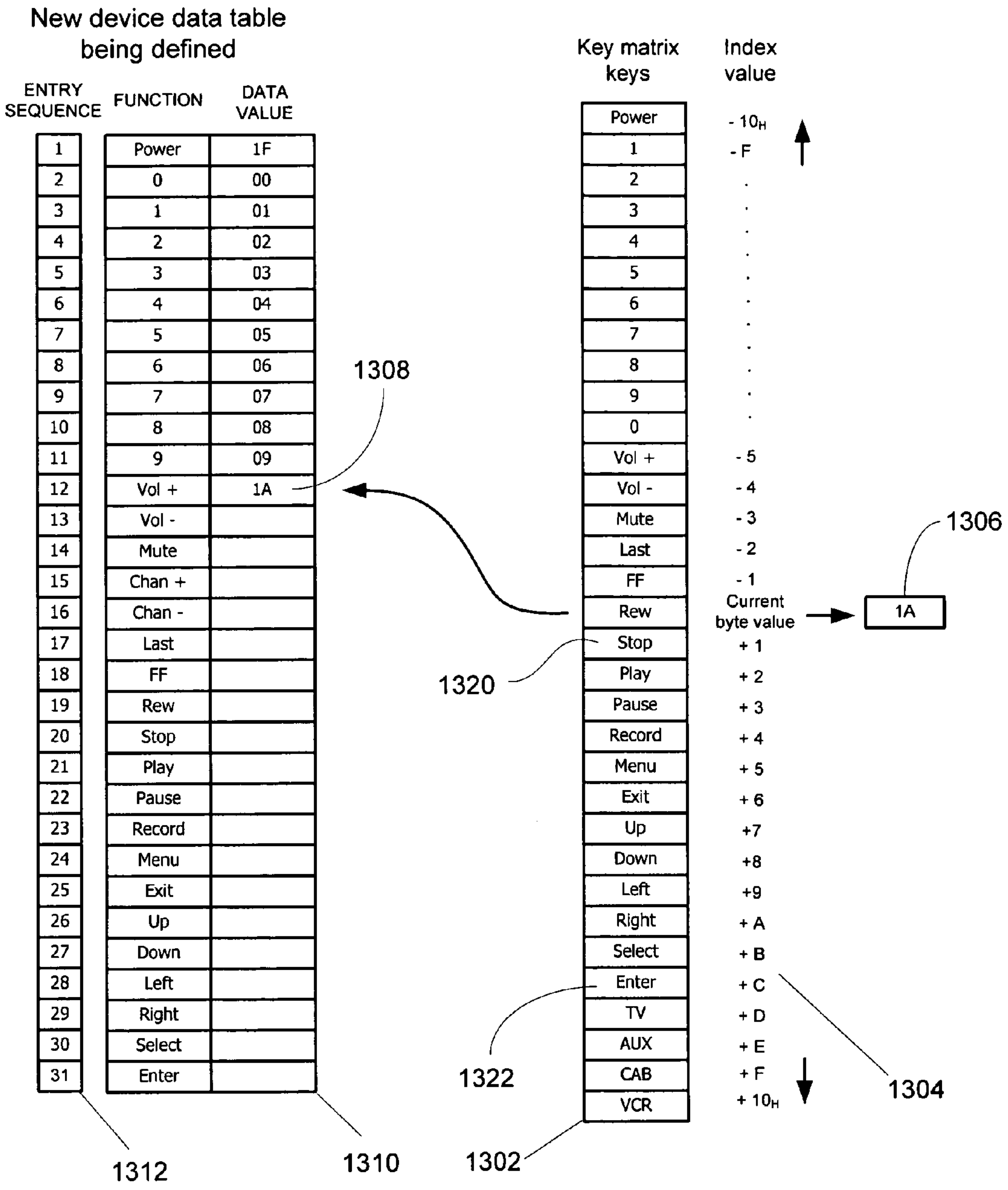

New device data table being defined

| ENTRY SEQUENCE | FUNCTION | DATA VALUE |
|---|---|---|
| 1 | Power | 1F |
| 2 | 0 | 00 |
| 3 | 1 | 01 |
| 4 | 2 | 02 |
| 5 | 3 | 03 |
| 6 | 4 | 04 |
| 7 | 5 | 05 |
| 8 | 6 | 06 |
| 9 | 7 | 07 |
| 10 | 8 | 08 |
| 11 | 9 | 09 |
| 12 | Vol + | 1A |
| 13 | Vol - | |
| 14 | Mute | |
| 15 | Chan + | |
| 16 | Chan - | |
| 17 | Last | |
| 18 | FF | |
| 19 | Rew | |
| 20 | Stop | |
| 21 | Play | |
| 22 | Pause | |
| 23 | Record | |
| 24 | Menu | |
| 25 | Exit | |
| 26 | Up | |
| 27 | Down | |
| 28 | Left | |
| 29 | Right | |
| 30 | Select | |
| 31 | Enter | |

| Key matrix keys | Index value |
|---|---|
| Power | $-10_H$ |
| 1 | - F |
| 2 | . |
| 3 | . |
| 4 | . |
| 5 | . |
| 6 | . |
| 7 | . |
| 8 | . |
| 9 | . |
| 0 | . |
| Vol + | - 5 |
| Vol - | - 4 |
| Mute | - 3 |
| Last | - 2 |
| FF | - 1 |
| Rew | Current byte value |
| Stop | + 1 |
| Play | + 2 |
| Pause | + 3 |
| Record | + 4 |
| Menu | + 5 |
| Exit | + 6 |
| Up | +7 |
| Down | +8 |
| Left | +9 |
| Right | + A |
| Select | + B |
| Enter | + C |
| TV | + D |
| AUX | + E |
| CAB | + F |
| VCR | $+10_H$ |

- Chan+ / Chan– increment / decrement current byte value by $11_H$ without storing any value into data table
- All other keys increment/decrement current byte value by the amount indicated, update current byte value and store that value into next available data table location.
- "Setup" key terminates entry mode.

Figure 13

| Mode | SETUP # |
|---|---|
| TV | 02D |
| VCR | 6F3 |
| CAB | 32C |
| AUX | Etc... |

1622

1614

Protocol #: 095
- Carrier frequency: 38KHz
- Duty cycle: 33%
- AGC burst: 9mS on, 4.5mS off
- "0": 0.56mS on, 0.56mS off
- "1" 0.56mS on, "0" 1.68mS off
- Frame: [P1+(SETUP & $1F_H$)],[D1],[$\overline{D1}$]

Protocol Definition 1608, 1610

| Protocol number | |
|---|---|
| 095 | |
| System code (P1) | |
| $60_H$ | |
| Function | Data value |
| Power | 1F |
| 0 | 10 |
| 1 | 11 |
| 2 | 12 |
| 3 | 13 |
| 4 | 14 |
| . | . |
| . | . |
| . | . |
| Ch+ | 3A |
| Ch- | 3B |
| Last | 3C |
| FF | 53 |
| Rew | 54 |
| Play | 51 |
| Stop | 52 |

Device Table

SYSTEM AND METHOD FOR DEFINING A CONTROLLED DEVICE COMMAND SET

BACKGROUND

Universal controlling devices, that is, for example, remote controls which are adaptable to issue commands to a multiplicity of appliances of different type and/or manufacture, and the features and functionality provided by such controlling devices are well known in the art. Early universal controlling devices such as, for example, that described in U.S. Pat. No. 4,623,887 were generally "learners," that is, they were adapted to capture, store, and subsequently play back the command signals of the original equipment remote controls corresponding to the appliances to be controlled. However, the required initial teaching process proved tedious and error prone, and universal controlling devices which included preprogrammed libraries of command codes, such as those described in U.S. Pat. No. 4,774,511 or 4,959,810, were introduced to overcome this problem. These universal controlling devices, however, suffer from the potential drawback that an appliance which is "unknown," i.e., not already present in the preprogrammed library of codes embedded in the device, cannot be controlled. To alleviate this drawback, multiple methods for upgrading a preprogrammed controlling device after it has left the factory, i.e., adding one or more entire command sets to a preprogrammed controlling device, have been proposed. In this regard see, for example, the aforementioned U.S. Pat. No. 4,959,810 or U.S. Pat. Nos. 5,226,077, 5,953,144, 5,537,463, 6,223,348 or U.S. Published Patent Application 2001/0033243. Alternatively, controlling devices which embody a combination of the two technologies (preprogrammed and learning) have also been proposed from time to time. All of these approaches, however, increase expense and/or complexity by requiring the provision of additional hardware either internal to the controlling device (e.g., a built-in modem, an IR receiver, etc.) or externally in the form of cables, adapters, etc., or both.

Accordingly, a need exists for a system and method to provide upgradeability to a controlling device in a simple manner and with minimal extra expense.

SUMMARY OF THE INVENTION

This invention relates generally to a system and method to enable a controlling device to support the addition of a new command code set definition at little or no extra hardware cost. The method contemplates manual entry by a consumer of a relatively short sequence of keystrokes on the keypad of the controlling device which, as will be seen, may serve to define a new set of appliance command codes which were not previously available in the stored library of codes within the controlling device. While manual entry of the data is preferred as a means to reduce the expenses that are associated with providing a controlling device with data receiving hardware, it will be appreciated that the teachings set forth hereinafter may nevertheless be used to determine data that serves to define a new set of appliance command codes which data may be provided to a controlling device in an automatic or semi-automatic manner without limitation.

In one described embodiment, a consumer may access a service hosted on a Web server and identify a needed device command code set by supplying, for example, the model number or other identifying characteristic(s) of the appliance to be controlled. An application on the Web server may then scan a representation of the data library known to be already present in the controlling device for matches on individual elements of the desired command code set such as, for example, function data patterns, protocol encoding, system address, etc. Using the best matches found, the server application may then build a definition of the desired command code set expressed in terms of subsets of data that will already be present in the controlling device, i.e., no new function data patterns, protocol encoding, system address, etc. will need to be downloaded into the controlling device.

This definition may then be encoded into a series of keystrokes, or other form suitable for provision to the controlling device which is to receive the input, which series of keystrokes are presented to the requesting consumer for entry into their controlling device. Since the consumer is not providing to the controlling device an entire command code data set but rather, for example, input data that is representative of a sequence of data flags, pointers, and data maps, the number of keystrokes required in this data entry instance may be minimized. The number of keystrokes required to provide the input data to the controlling device may be further reduced by making use of all the keys available on the keypad of the controlling device (e.g., those beyond labeled keys 0-9 as would preferably be used to provide base 10 encoded input) such that keys on the keypad are used to represent values encoded, for example, as hexadecimal or even duotrigesimal (base 32) values.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which:

FIG. 13 illustrates an exemplary application of the dynamic indexing method of FIG. 11;

DETAILED DESCRIPTION

Figure 1:
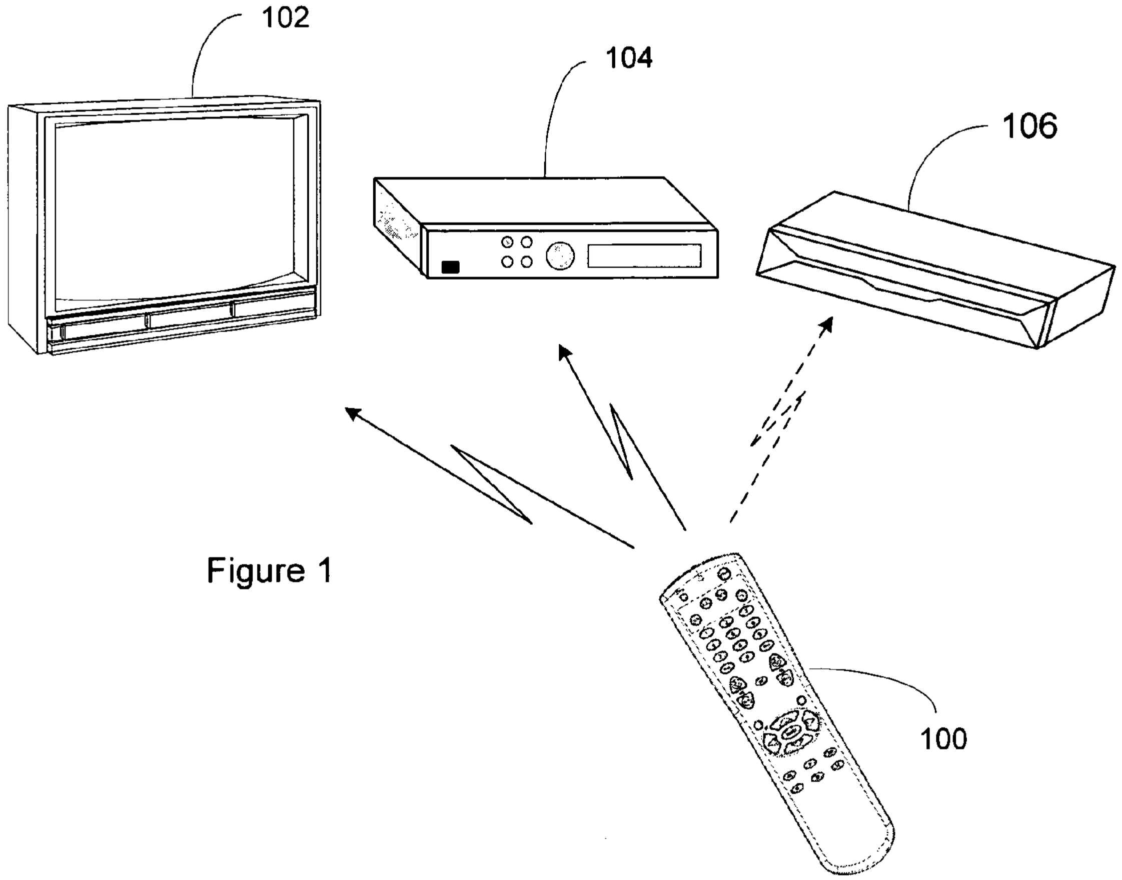
FIG. 1 illustrates an exemplary system in which an exemplary controlling device according to the instant invention may be used.
Figure 17:
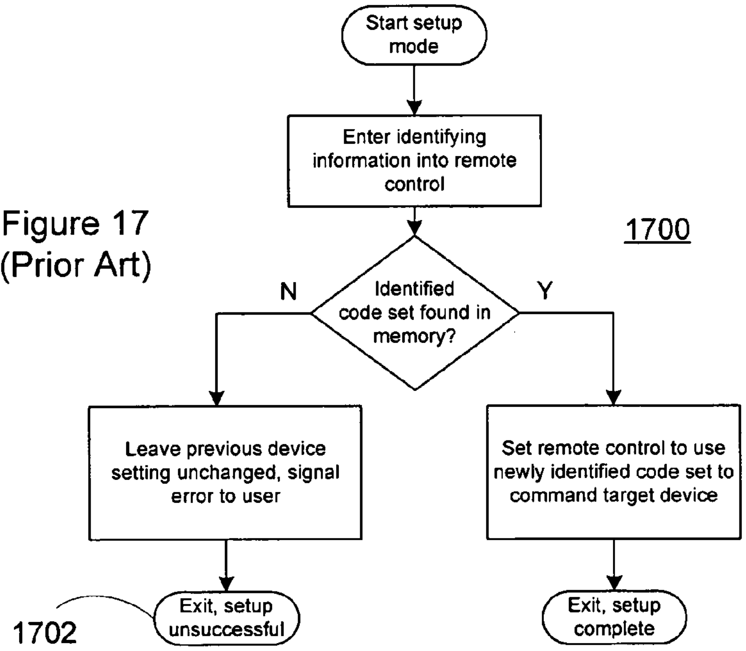
Figure 17 (Prior Art)
FIG. 17 illustrates a flow chart of a prior art method for setting up a controlling device.

Turning now to FIG. 1, there is illustrated an exemplary system in which a controlling device 100 has been previously adapted to control various controllable appliances, such as a television 102 and set top box ("STB") 104, for example by being setup using the methods disclosed in U.S. Pat. No. 4,959,810 or other methods as are well known in the art, all as generally illustrated by the flowchart of FIG. 17. In keeping with the descriptions which follow and as generally illustrated in FIG. 5B, controlling device 100 is now to be further adapted to control a newly-introduced appliance 106, e.g., an appliance introduced at a time after the controlling device 100 left the factory, for which appliance 106 the controlling device 100 was not preprogrammed with a corresponding command code set. As is known in the art, the controlling device 100 is capable of transmitting commands to the appliances, using any convenient IR, RF, Point-to-Point, or networked protocol, to cause the appliances to perform operational functions, provided the control protocols and command values to be used are known to the operational software of controlling device 100. While illustrated in the context of a television 102, STB 104, and new appliance 106, it is to be understood that controllable appliances may include, but are not limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc.

Figure 3:
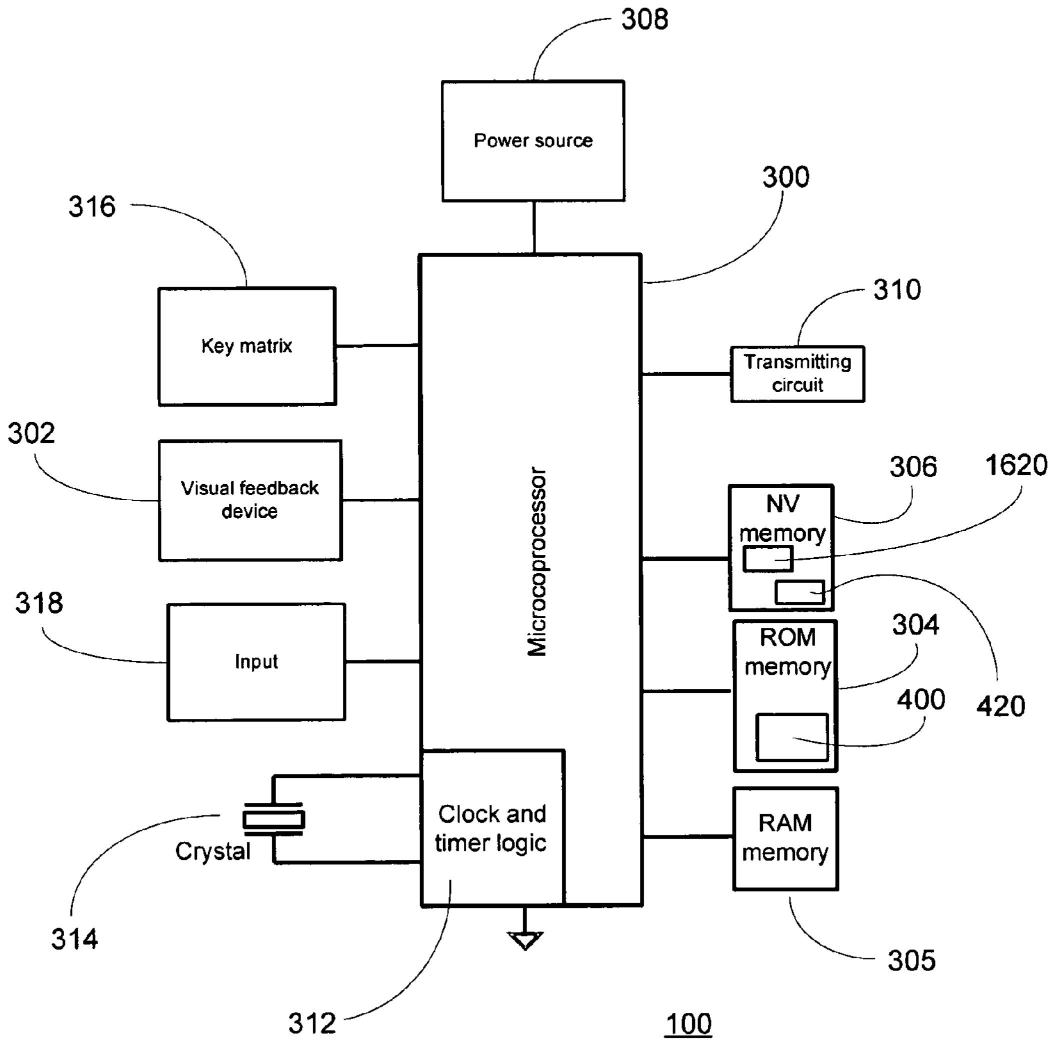
FIG. 3 illustrates a block diagram of exemplary components of the exemplary controlling device of FIG. 2.

With reference to FIG. 3, for use in commanding the functional operations of one or more appliances, the controlling devices 100 may include, as needed for a particular application, a processor 300 coupled to a ROM memory 304, a RAM memory 305, a key matrix 316 (e.g., hard keys, soft keys such as a touch sensitive surface overlaid on a liquid crystal (LCD), and/or an electroluminescent (EL) display), transmission circuit(s) 310 and/or transceiver circuit(s) (e.g., IR and/or RF), a non-volatile read/write memory 306, a means 302 to provide feedback to the user (e.g., one or more LEDs, display, speaker, and/or the like), a power source 308, an input/output port 318 such as a serial interface, modem, Zigbee, WiFi, or Bluetooth transceiver, USB port, etc., and clock and timer logic 312 with associated crystal or resonator 314.

As will be understood by those skilled in the art, some or all of the memories 304, 305, 306 may include executable instructions (collectively, the program memory) that are intended to be executed by the processor 300 to control the operation of the remote control 100, as well as data 400 which serves to define the aforementioned control protocols and command values to the operational software (collectively, the command data). In this manner, the processor 300 may be programmed to control the various electronic components within the remote control 100, e.g., to monitor the power supply 308, to cause the transmission of signals, control the key illumination means 320, 322, and 324, etc. The non-volatile read/write memory 306, for example an EEPROM, battery-backed up RAM, FLASH, Smart Card, memory stick, or the like, may additionally be provided to store setup data and parameters as necessary. While the memory 304 is illustrated and described as a ROM memory, memory 304 can also be comprised of any type of readable media, such as ROM, FLASH, EEPROM, or the like. Preferably, the memories 304 and 305 are non-volatile or battery-backed such that data is not required to be reloaded after battery changes. In addition, the memories 304, 305 and 306 may take the form of a chip, a hard disk, a magnetic disk, an optical disk, and/or the like. Still further, it will be appreciated that some or all of the illustrated memory devices may be physically incorporated within the same IC chip as the microprocessor 300 (a so called "microcontroller") and, as such, they are shown separately in FIG. 3 only for the sake of clarity.

To cause the controlling device 100 to perform an action, the controlling device 100 is adapted to be responsive to events, such as a sensed user interaction with the key matrix 316, etc. In response to an event, appropriate instructions within the program memory (hereafter the "operating program") may be executed. For example, when a function key is actuated on the controlling device 100, the controlling device 100 may retrieve from the command data the command value and control protocol corresponding to the actuated function key and the current device mode, from memory 304, 305, 306 (as will be described in greater detail hereafter) and transmit the command to an intended target appliance, e.g., STB 104, in a format recognizable by that appliance. It will be appreciated that the operating program can be used not only to cause the transmission of command codes and/or data to the appliances, but also to perform local operations. While not limiting, local operations that may be performed by the controlling device 100 may include displaying information/data, favorite channel setup, macro key setup, function key relocation, etc. Examples of local operations can be found in U.S. Pat. Nos. 5,481,256, 5,959,751, and 6,014,092. An additional local operation is the ability to "lock" function keys across device operational modes as described in U.S. Published Patent Application No. 2003/0025840.

Figure 2:
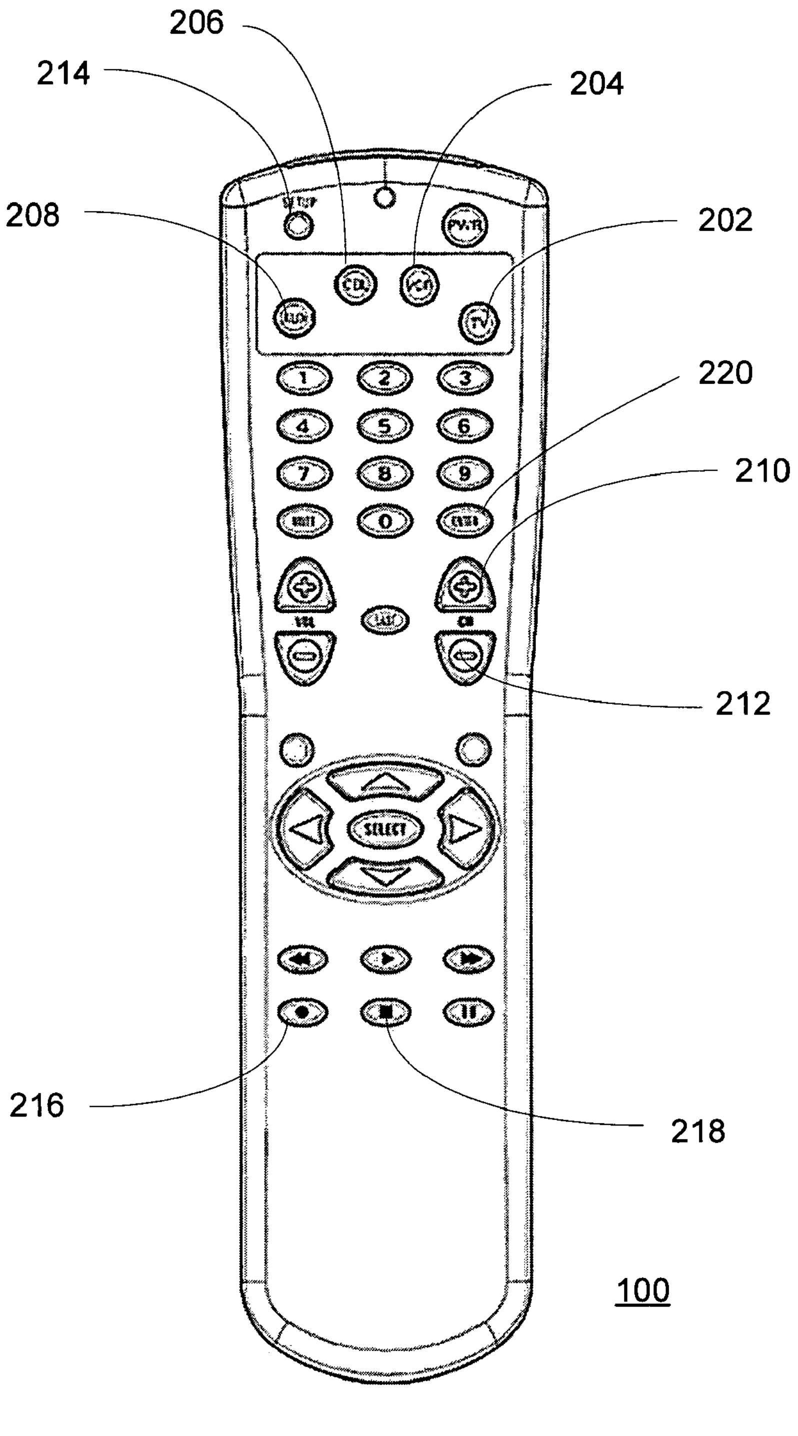
FIG. 2 illustrates a top level view of the exemplary controlling device illustrated in FIG. 1.

For creating a correspondence between command data and a function key, data may be entered into the controlling device 100 that serves to identify an intended target appliance by its type and make (and sometimes model) as illustrated in FIG. 17. Such data allows the controlling device 100 to identify the appropriate command data within a preprogrammed library of command data that is to be used to transmit recognizable commands in a format appropriate for such identified appliances. Typically, intended target appliances for function key actuations are identified for each device mode state of the controlling device 100. By way of example, FIG. 2 illustrates a controlling device 100 having a "TV" device mode state, a "VCR" device mode state, a "CBL" device mode state, and an "AUX" device mode state, which are selectable through actuation of corresponding device mode selection keys 202, 204, 206 and 208 respectively. Since methods for setting up a controlling device to command the operation of specific home appliances are well-known, such methods need not be described in greater detail herein. Nevertheless, for additional information pertaining to setup procedures, the reader may turn to U.S. Pat. Nos. 4,959,810, 5,614,906, and 6,225,938. It will also be appreciated that the controlling device 100 may be set up to command an appliance 102, 104, or 106 by being taught the command codes needed to command such appliance as described in U.S. Pat. No. 4,623,887. Still further, it will be understood that command data may pre-stored in the controlling device 100 or the controlling device 100 may be upgradeable, for example via use of external input 318 or via user interaction with key matrix 316 as described hereafter.

Figure 4:
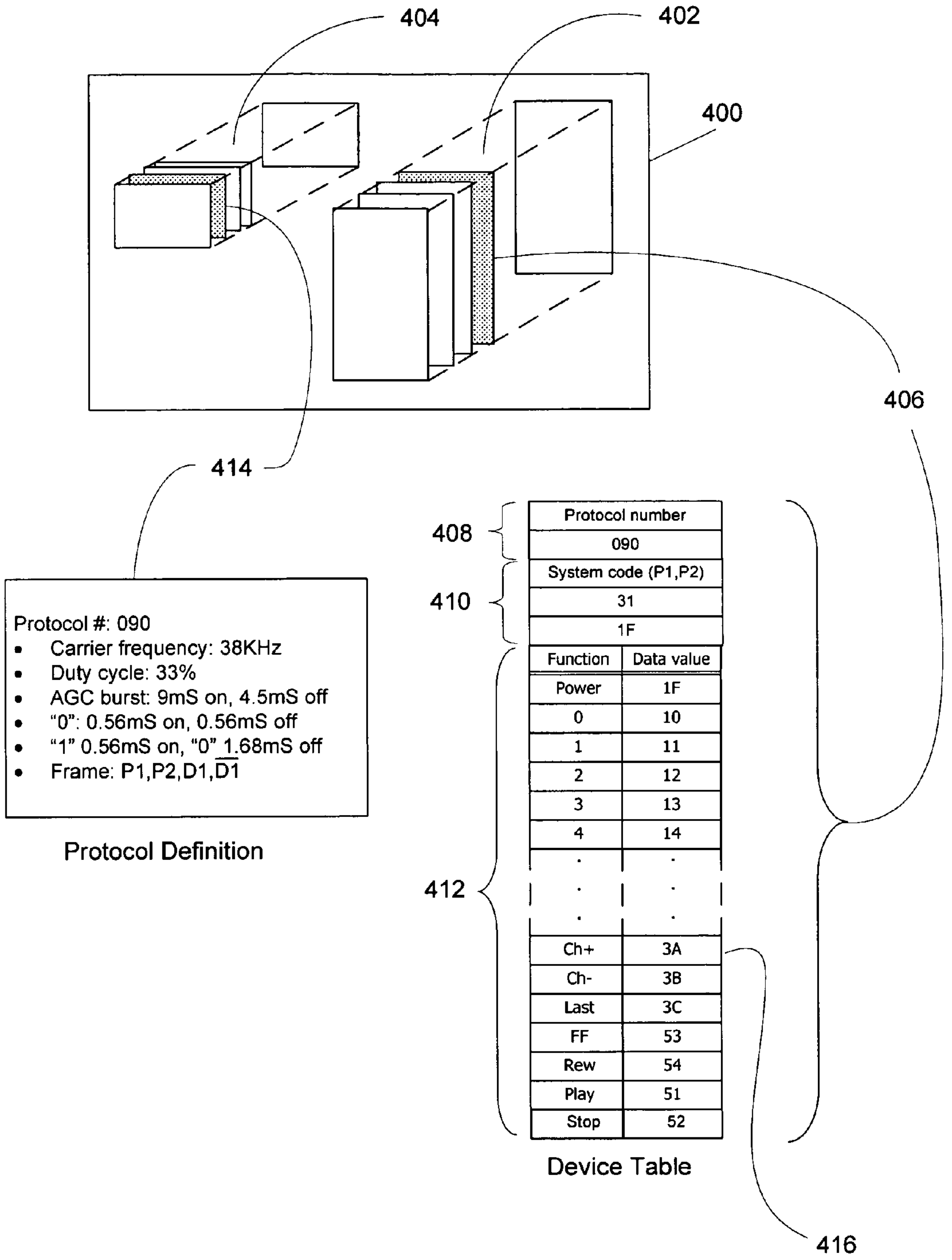
FIG. 4 illustrates an exemplary command data library structure of the exemplary controlling device of FIG. 2.

In one approach to the analysis and storage of appliance command codes described, for example, in U.S. Pat. No. 5,515,052 "Universal Remote Control with Function Synthesis," of like assignee and incorporated herein by reference in its entirety, transmitted appliance commands may in general be fully characterized by three items of data: a definition of the transmission protocol to be used; one or more bytes of system code, or header, applicable to every command destined for a particular appliance; and, typically, a single byte value corresponding to a particular device function to be executed. Accordingly, to provide a controlling device with universal capability, an exemplary set of command data 400 may be structured as illustrated in FIG. 4. Each possible target appliance (or family of target appliances sharing the same function command set) may be defined by an individual table 406 in a stored library of device tables 402. Selection of an appliance to be controlled may then be performed during a set up mode by entering a sequence of key strokes, e.g., by activating keys "0," "6," and "0" in sequence, which entered value may be stored in for example non-volatile memory 306 and serve to identify a command code set to be used, for example, as illustrated in FIG. 17 or described in U.S. Pat. No. 6,587,067 of like assignee and incorporated herein by reference in its entirety.

As further illustrated in FIG. 4, an exemplary command code set may include a device table 406 which may contain a reference 408 to a transmission protocol to be used, one or more bytes of system code information 410, and a list of data values 412 corresponding to individual command functions. Protocol reference 408 in turn may identify a particular protocol definition entry 414 from a stored library of protocol definitions 404. Exemplary protocol definition 414 may include information such as IR sub-carrier frequency and duty cycle, bit encoding information, any preamble which is to be transmitted prior to the encoded data frame—for example a burst of continuous carrier which serves to stabilize the receiver's automatic gain control ("AGC burst")—and information regarding the order and format of the data fields to be included in the transmitted data frame. As will be appreciated by those of skill in the art, a particular transmission protocol definition may be referenced by more than one device table—by way of example, a TV and a VCR from the same manufacturer may use the same transmission protocol and, possibly, even a similar set of command function data values, the devices differentiated by separate system or device code values for each appliance type. It will also be appreciated that while various textual labeling is shown in the data structures of FIG. 4 et seq., the labeling is included in these illustrations only for the sake of clarity and for the convenience of the reader and, as such, these labels may not necessarily be present within the data structures actually implemented in practice.

In accordance with this exemplary embodiment, when a function key is actuated on controlling device 100, for example "Channel Up" 210, the operating program may, based upon the setup parameters previously entered for the current device mode, retrieve a function command data value, e.g., byte 416, from device table 406 and pass this value together with system code values 410 and protocol definition data 408/414 to an IR driver program to cause output of the appropriate appliance command via transmitting circuit 310.

As will be appreciated, practical limitations on the memory size of a controlling device 100 generally mean that the libraries embodied within pre-loaded command data 400 cannot encompass every possible appliance command set. Furthermore, new appliances using as-yet undefined command code sets may be introduced to the market at any time subsequent to the manufacture and sale of controlling device 100. Accordingly, various methods have been proposed to enable an existing controlling device to be upgraded with additional command code data when it is found that a desired command set is not available in the memory of controlling device 100, e.g., by observing an unsuccessful outcome 1702 of the setup process generally illustrated by flowchart 1700. These generally have taken the form of either replacing all or part of the command data 400, or of loading of a supplemental set of data into, for example, non volatile read/write memory 306. In this connection see, for example, U.S. Pat. Nos. 4,959,810, 5,414,761 or 5,537,463 all of like assignee and incorporated herein by reference in their entirety. However, these previous methods have generally required the provision of additional data coupling means on the controlling device and/or additional external hardware in the form of cables, connectors, modems, etc.

In contrast, the instant invention envisages a system and method whereby a new device definition may be user-installed in controlling device 100 via a sequence of inputs on key matrix 316. No additional specialized data coupling or hardware would therefore be required.

Figure 5A:
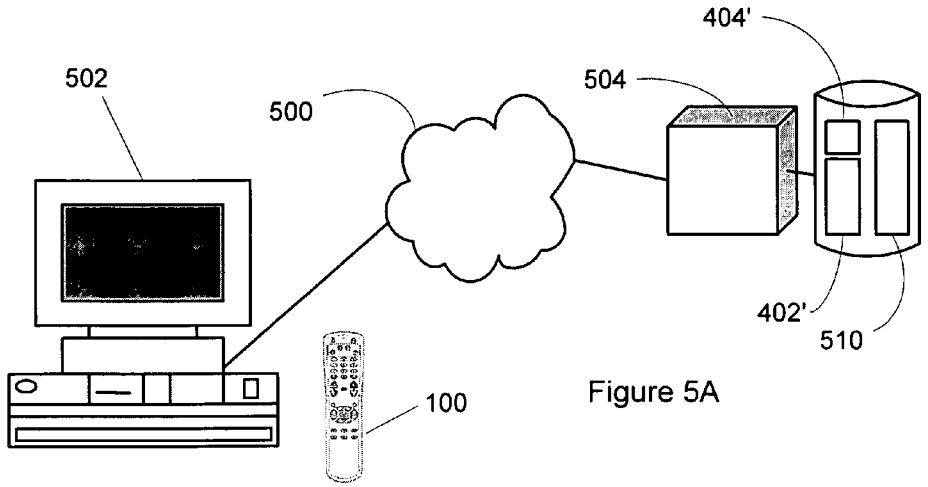
FIG. 5A illustrates an exemplary system whereby upgrade instructions may be obtained for the exemplary controlling device of FIG. 2.
Figure 5B:
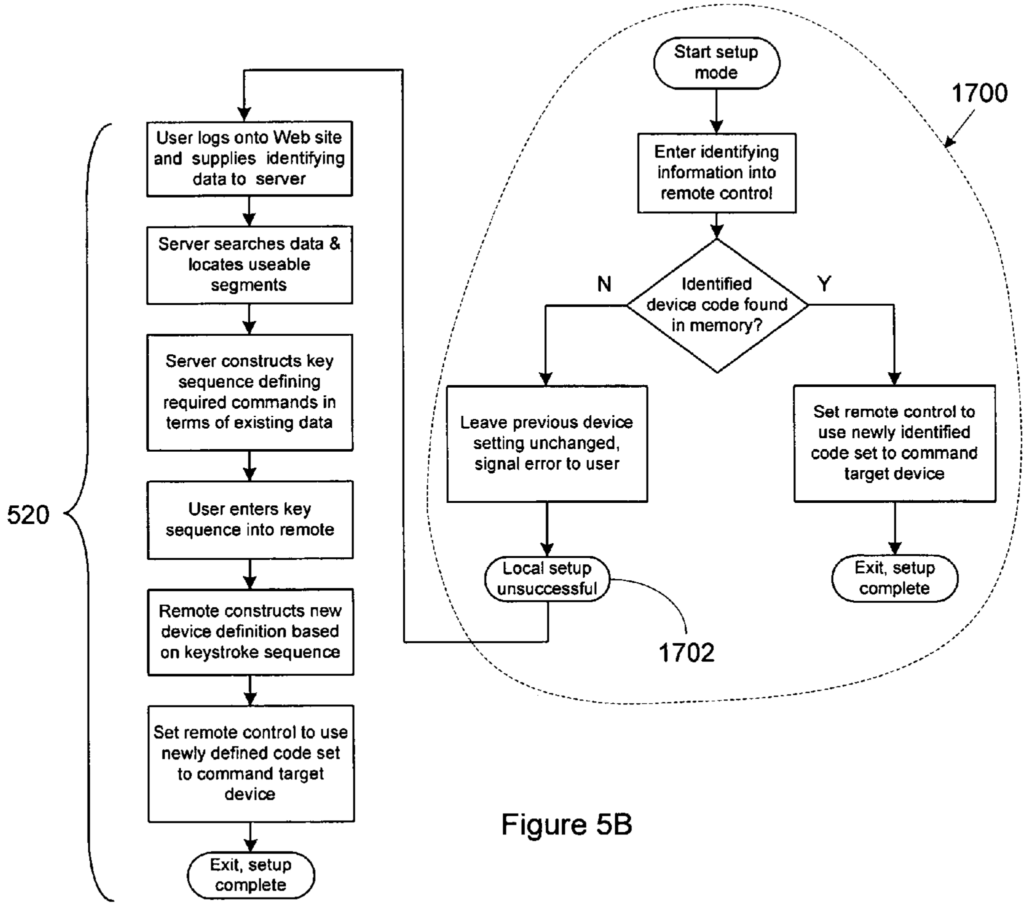
FIG. 5B illustrates an exemplary method whereby upgrade instructions may be obtained within the exemplary system of FIG. 5A.
Figure 6:
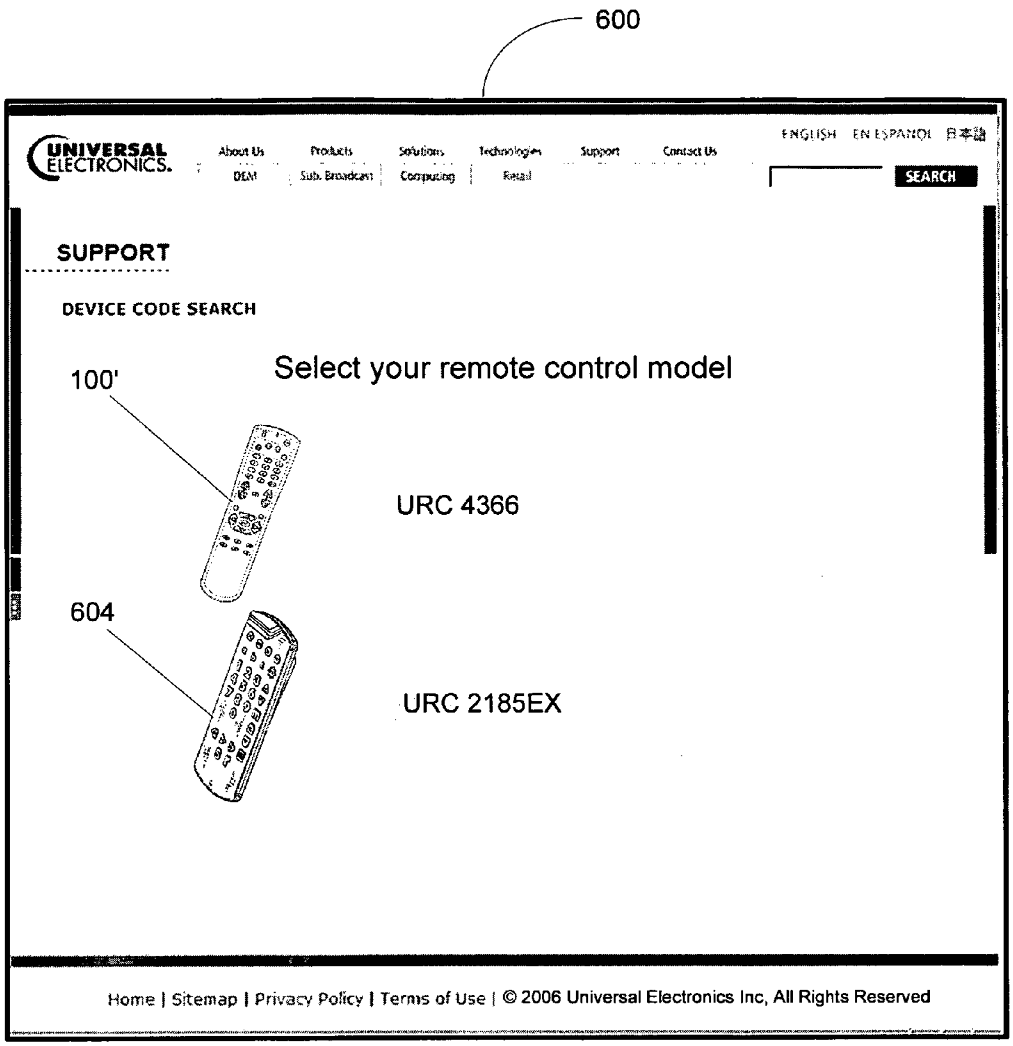
FIGS. 6 though 8 illustrate exemplary user interface Web pages of the exemplary Web server of FIG. 5.
Figure 7:
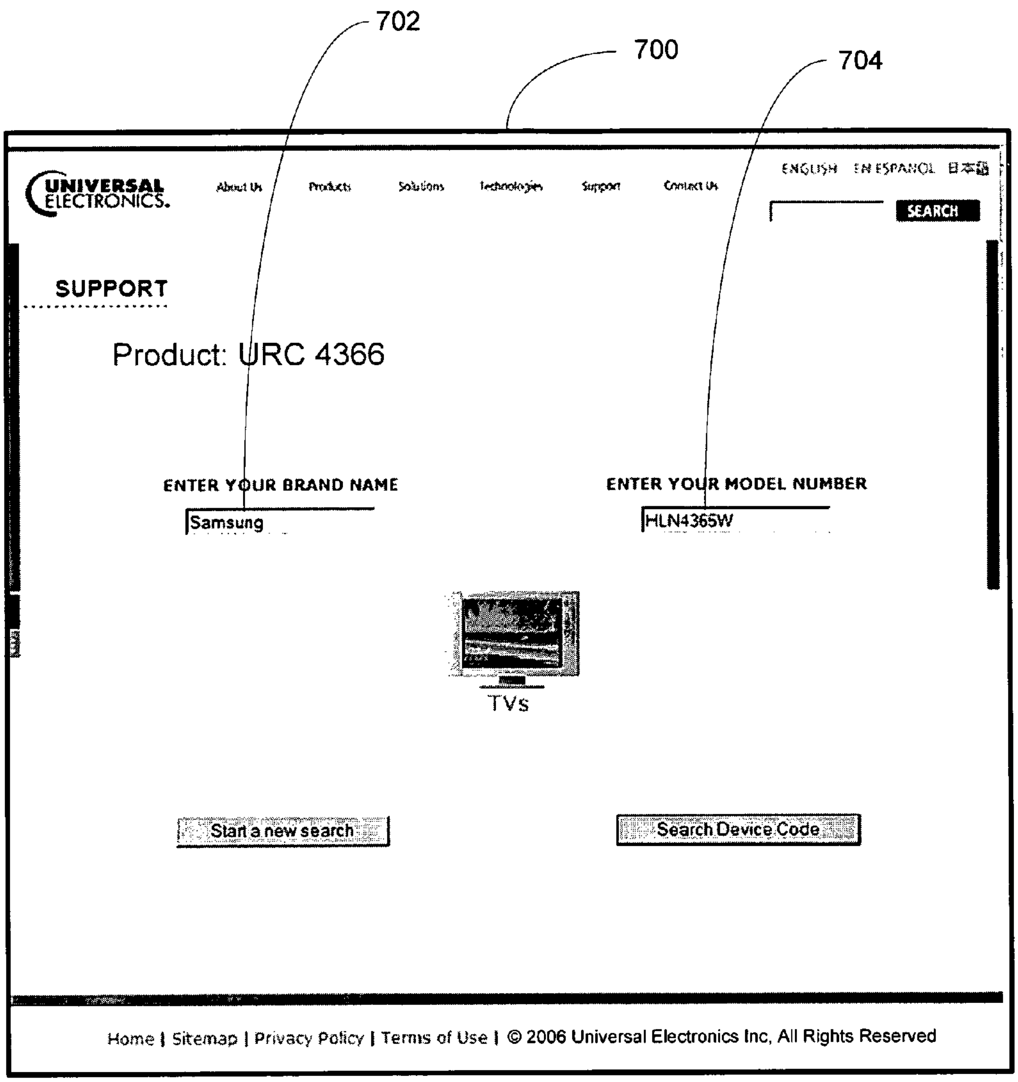
Figure 8:
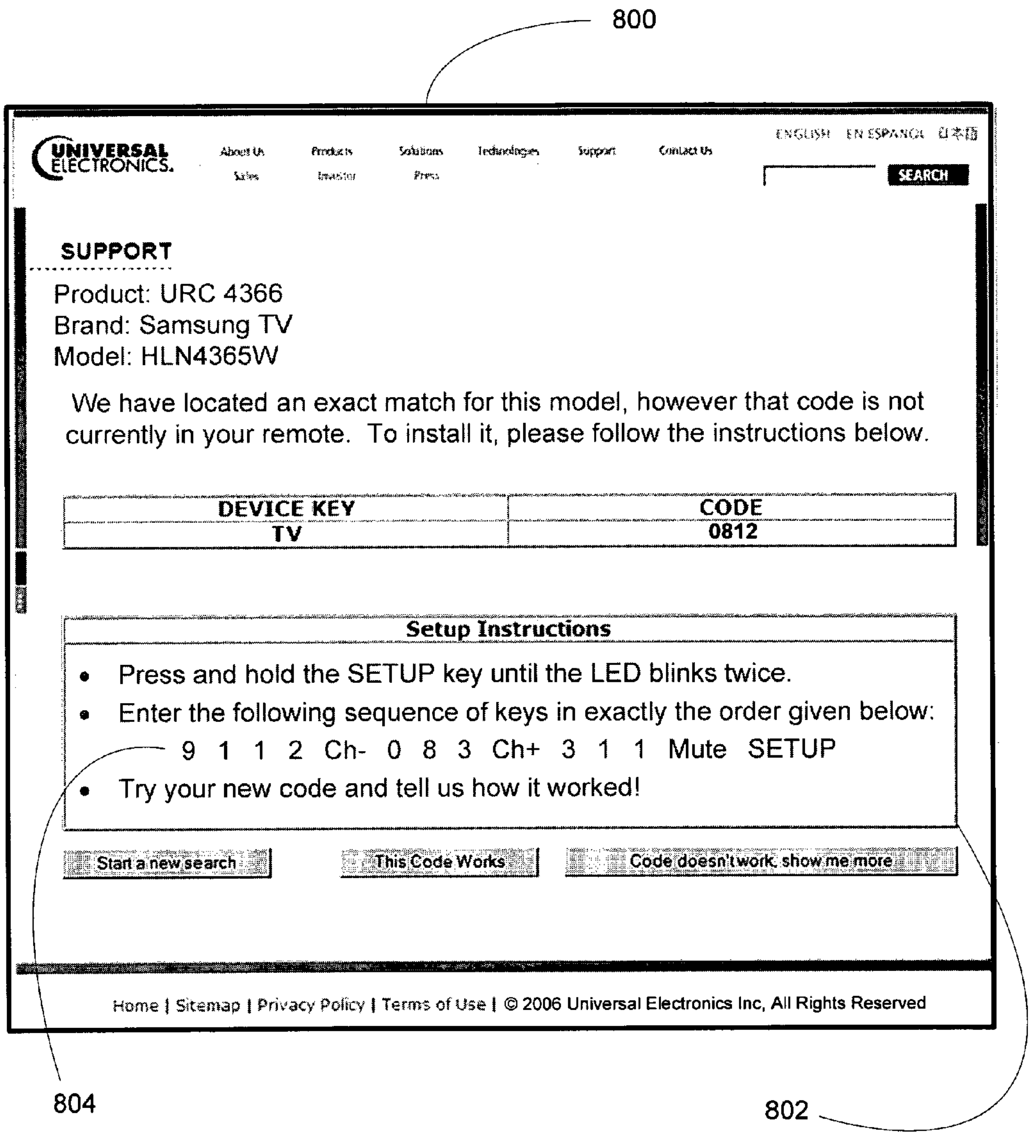

In one exemplary embodiment, a user of controlling device 100, having discovered 1702, as illustrated in FIG. 5B, that the command set of a device to be controlled, for example device 106, is not available in the pre-loaded command data library 400, may access a server 504, illustrated in FIG. 5A, from his home or office PC 502 via the Internet 500, PSTN, or any other convenient communication means and, following the series of steps generally illustrated by flowchart section 520, obtain from the server 504 a keystroke sequence which may be utilized to install a new device definition into controlling device 100 that is adapted to support the appliance 106. It will be appreciated that, although a conventional personal computer is used for illustrative purposes in this example, in other embodiments any appliance or device capable of providing appropriate user access to a server application may be used for this purpose, for example a digital STB, cellular telephone, PDA, Webpad, interactive TV set, etc., without limitation. As illustrated in FIGS. 6, 7, and 8, to obtain the data to be used to install into controlling device 100 support for the appliance 106, the user may begin by identifying to the server 504 the model of their controlling device 100, for example by providing such information to the server 504 via interactions (e.g., by data entry, selection from choices, etc.) with an opening screen 600. Next, the user may enter information (in similar fashion) which serves to identify the appliance to be controlled using the to be installed new device definition, for example appliance 106. As illustrated in FIG. 7, this may be done by way of a model number entry screen 700 where the brand 702 and model number 704 of the appliance may be supplied for selection using conventional drop down menus. It will be appreciated that other methods of appliance identification, for example direct knowledge of a desired setup code number (as disclosed in U.S. Pat. No. 4,959,810), entry of a OEM remote control model number, browsing pictures of the appliance or its OEM remote control, etc. are also possible. It will be also be appreciated that these steps as well as the returning of the keystroke data to be provided to the controlling device 100, described hereinafter, may be performed, for example, by communicating with a service representative, for example by phone, email, instant messaging, etc.

Upon receiving the controlling device 100 and appliance 106 identification data, server 504 may access a global database 510 of all known appliance control codes. The server 504 may also access information regarding the contents of the pre-loaded command code libraries of the various models of controlling device—e.g. 100, 604—that the server 504 is equipped to support. More particularly, using the appliance information (e.g., 702, 704) supplied by the user, server 504 locates a command code set appropriate for the identified appliance in a global database 510 (which itself will be updatable to include the command code sets for appliances as they are introduced into the market). Using the controlling device identity supplied by the user, server 504 then scans a representation 402', 404' of the contents of the data libraries known to already be in controlling device 100. In this manner, the server 504 may discern matches within the data libraries already stored within the controlling device 100 to individual elements, e.g. function data patterns, protocol encoding, system address, etc., of the command code set identified as being appropriate for the identified appliance.

Using the best matches found, the server 504 may then build a definition of the desired new command code set, e.g., a command code set to be used to command operations of appliance 106, which command code set will be expressed in terms of sections of other data already known to be present in the remote 100. A description of this definition may then be encoded by the server 504 into a sequence of keystrokes to be entered using the key matrix 316 of controlling device 100, as will be described in greater detail hereafter. To allow a user to provide the definition to the remote control 100, the keystroke sequence 804 so arrived at may be presented to the user in, for example, a result screen 800 together with instructions 802 on how to input the keystroke sequence into controlling device 100 in order to implement a command code set for the device 106. It will be appreciated that although scanning data libraries and encoding keystroke sequences are described above as occurring in conjunction with user interaction, in certain embodiments all or part of these processes may be performed ahead of time and results stored on the sever as pre-defined sequences, in order to optimize response time.

During or after entry into controlling device 100 by the user of the supplied keystroke sequence, the supplied keystroke sequence will be decoded by the operating program and used to construct a new device definition table 420 in non-volatile read/write memory 306. In an alternative embodiment, the keystrokes themselves or representation thereof may be stored in non-volatile memory 306 and used to construct a device table "on the fly," in keeping with the methodology to be described hereinafter, each time a command is to be issued to appliance 106.

Since the user is not entering data which functions to define an entire device definition table but, as will be seen, data that generally functions as a series of flags, pointers, and data maps, the number of keystrokes required to be entered on the controlling device 100 to define the new device definition table 420 is minimized. The number of keystrokes required to be entered on the controlling device 100 for the purpose of defining the new device definition table 20 may be further reduced by making use of all available keys on key matrix 316, for example by encoding the to be entered data as hexadecimal (base 16) or duotrigesimal (base 32) values.

One exemplary method by which the results of the data library search by server 504 may be encoded into a series of keystrokes for entry into controlling device 100 will now be discussed in further detail. To assist in following the steps of this process which is described in the following paragraphs, reference may be made to the flowchart of FIG. 14.

In general, the initial search performed by the server 504 for partial matches within the data libraries already stored within the controlling device 100 to individual elements, e.g. function data patterns, protocol encoding, system address, etc., of the command code set identified as being appropriate for the identified appliance will result in one of four possible outcomes:

1. The required protocol definition or one similar to it is found to be within the remote control 100, together with a device data table in which all or most function data values are found, and the data table structure is an exact match (i.e., not only do the values exist in the table, but they are also in the correct order)
2. The required protocol definition or one similar to it is found to be within the remote control 100, together with a device data table in which all or most function data values are found, however the values are not in the correct order.
3. The required protocol definition or one similar to it is found to be within the remote control 100, but no matching function data is found in any device table that exists in the target controlling device.
4. No suitable protocol definition is found to be within the remote control 100.

In this context it will be understood by those of skill in the art that in searching for a protocol definition, while an exact correspondence is clearly preferable, a similar protocol may also be acceptable. In general, receivers embodied in consumer appliances are designed to accept and decode incoming signals with a degree of tolerance for variations in frequency, timing, etc.—this for example to permit the use of inexpensive components in their original equipment remote controls. Accordingly, a protocol which, for example, although not an exact match but similar in timing and frequency may still be functional to enable control of a particular appliance, perhaps at the expense of some aspect of performance such as range. In this regard data may be collected and made available to server 504 which serves to define the parameters for such functional equivalency in the receipt and processing of command protocols and codes by particular appliances such that searches performed by server 504 in accordance with the inventive concepts described herein yield the broadest set of potentially usable data for use in configuring the subject remote control to command the operation of a new desired appliance. It should thus be understood that in general the use of the term "match" in this context is intended to comprise all instances wherein one item may serve as a functional substitute for another item.

If however even no similar protocol definition can be located by the search and the final outcome is (4) above, a new device code cannot be defined by the exemplary method, and this case will thus not be addressed further.

Figure 14:
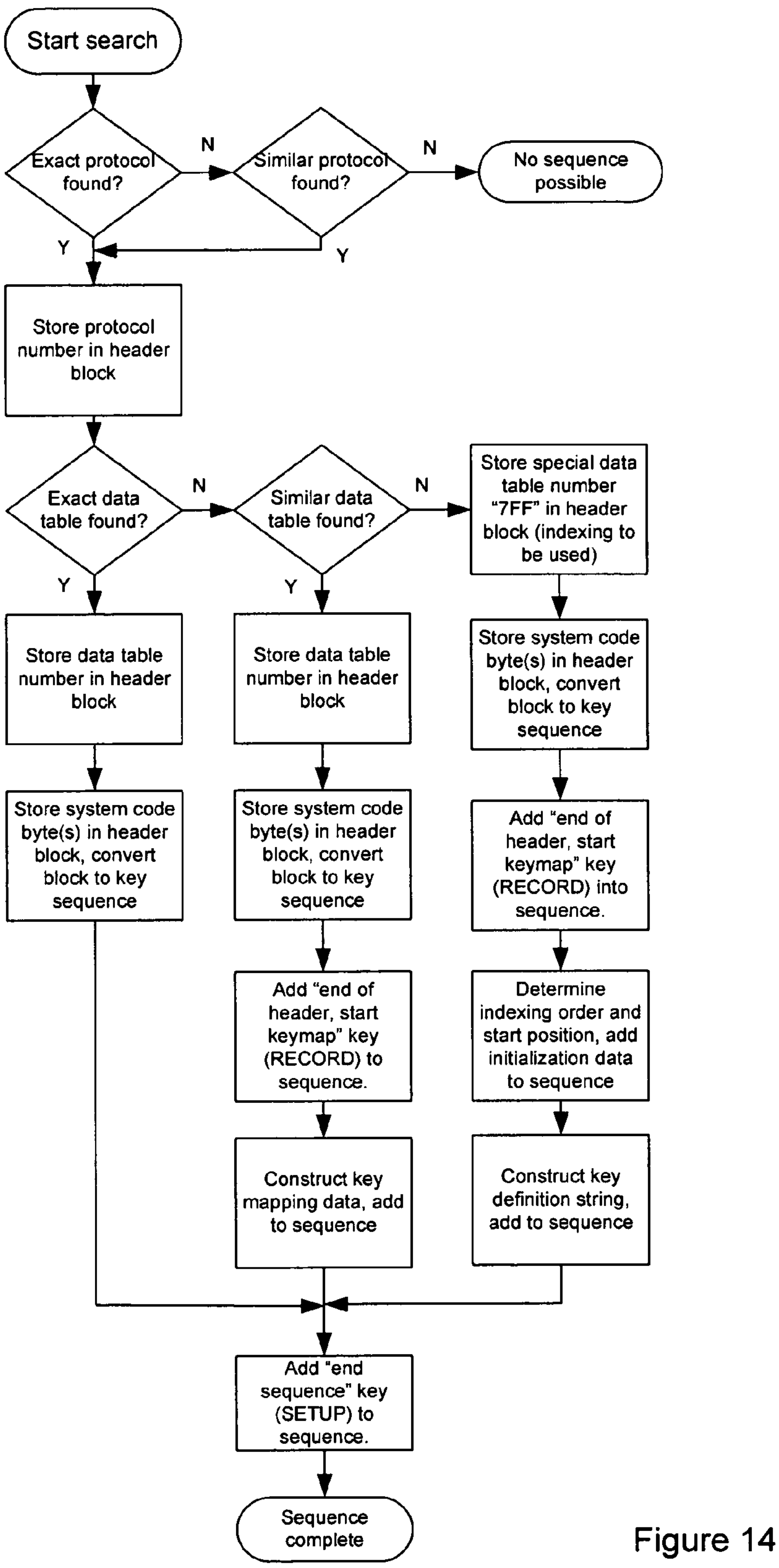
FIG. 14 illustrates in flow chart form an exemplary series of steps involved in creating an exemplary header data block and key mapping sequence.

To cater for the three viable cases set forth above, keys may be activated on the controlling device 100 to identify to the controlling device 100:

That the controlling device 100 is to be placed into a state to accept entry of a device definition key sequence; followed by (continuing with FIG. 14)

Figure 9:
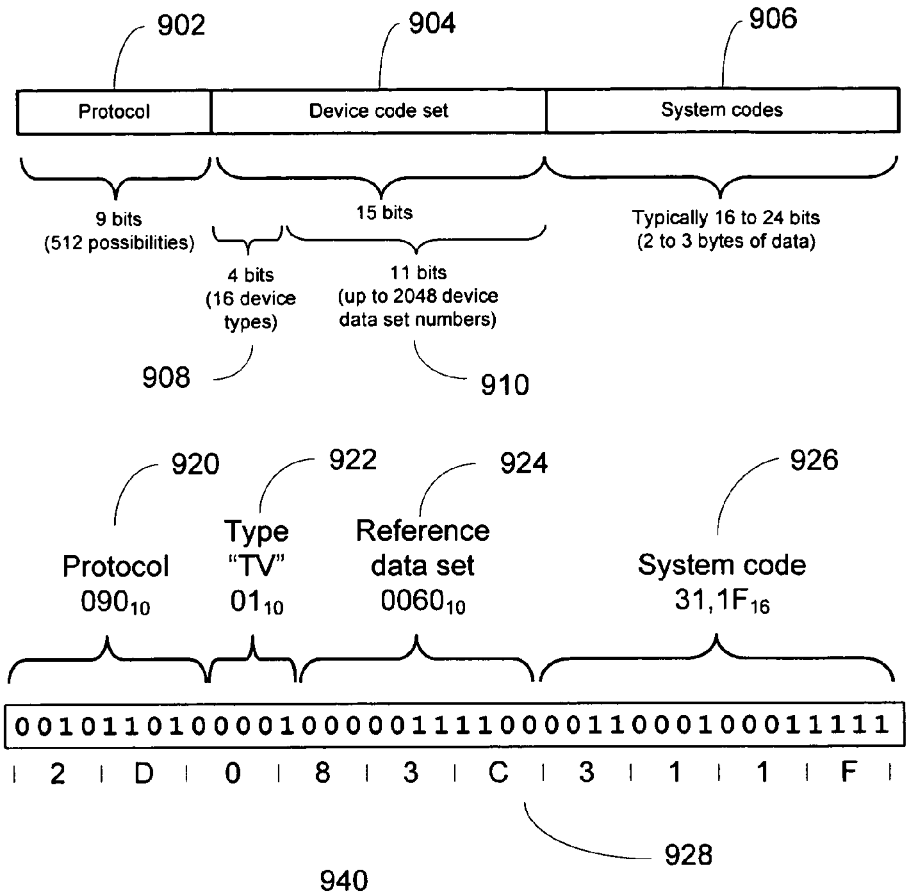
FIG. 9 illustrates an exemplary method of encoding exemplary upgrade information into a sequence of keystrokes to be entered into the exemplary controlling device of FIG. 2.

A definition for a header block, illustrated by way of example in FIG. 9, comprising several bytes encoded in hexadecimal representation which defines:

A control protocol number 902 (to be selected from control protocol library 404);

A device table number 904, further comprising a device type 908 and data set number 910 within that device type 908 used to cause selection of a particular device table from device table library 402, hereafter referred to as the "reference device" (noting that the device type field 908 is only to effect selection of an appropriate existing device table, that the new device under definition may not be constrained to be of the same type as the reference device, and that one or more device numbers, for example all "1's" ($7FF_H$), may be reserved and assigned particular significance, e.g., in the exemplary embodiment described this may be used to indicate outcome (3) above and that the data that follows is to be the subject of special processing as described hereafter); and A variable number of system bytes as required by the protocol and device table selected; followed by A delineation of the end of the header block, comprising two possibilities:

End of header block and end of sequence, i.e. a signal to the controlling device 100 to exit the device definition state provided, for example, by activation of the "setup" key 214 (this corresponds to outcome (1) above), or End of header block and an indication that a key remapping sequence or other data follows provided, for example, by activation of the "record" key 216 (this corresponds to outcome (2) or (3) above both of which will be discussed in further detail hereafter.)

By way of more detailed example, if a new device were to be defined as using protocol number ninety (090) 920, reference device type TV (01) 922 and data set number sixty (60) 924 (each in base 10 in the illustrated example) with two system code byte values $31_H$ and $1F_H$ respectively (each in base 16 in the illustrated example), the hexadecimal representation 928 of this bit string would be 2D083C311F. If the keys of key matrix 316 are assigned hexadecimal digit significance as in the exemplary manner illustrated in table 940 during the device definition state, i.e., when the controlling device is placed into the aforementioned state to accept entry of a device definition key sequence, then the key sequence 950 required to enter the data 2D083C311F into controlling device 100 would be:

(1) 2,Ch−,0,8,3,Ch+,3,1,1,Mute as illustrated. It will be appreciated that in an alternative embodiment, provided at least 32 keys on a controlling device are available to be used in the device definition mode, encoding bit strings into duotrigesimal numbers in place of hexadecimal would reduce the number keystrokes to be entered on the key matrix by 20%, e.g. from a total of ten to eight in the example presented above.

Figure 10:
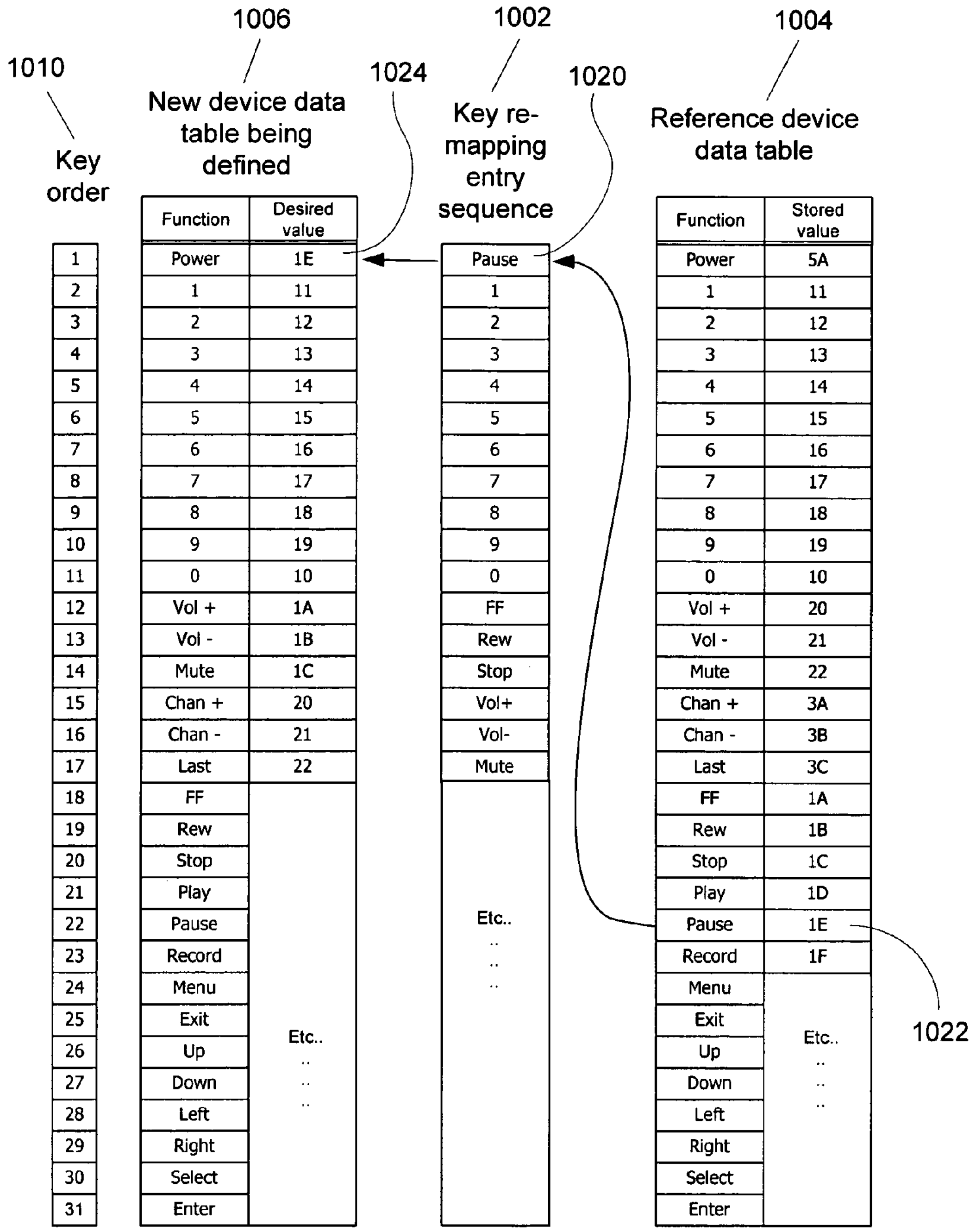
FIG. 10 illustrates an exemplary method of mapping function data values from an exemplary reference device onto an exemplary new device being defined for the exemplary controlling device of FIG. 2.

In the case of outcome (2) above, the header block may be followed by a sequence of keystrokes which serve to map the data values in the reference device table to the desired physical keys on the remote, in the order entered. FIG. 10 illustrates a key sequence 1002 which may be used to map the data values of a reference device 1004 to the desired key functions of device being defined 1006. By way of example, if it was determined by the Web server application that activation of "power" function key should result in the transmission of the data value $1E_H$ to the appliance 106 to be controlled (considering the protocol and system code(s) previously specified in the header block), then the first key entry in the mapping sequence 1020 would be "pause," indicating that the data 1022 corresponding to the pause function of reference device table 1004 is to be used for the power function 1024 of the new device table being defined. Following the example illustrated in FIG. 10, it can thus be seen that sequence 1002, viz.

(2) Pause,1,2,3,4,5,6,7,8,9,0,FastFwd,Rewind,Stop,Vol+, Vol−,Mute, . . . entered in a sequence corresponding to the given key order 1010, i.e., an order predefined as part of the programming of the control device 100, will result in the illustrated mapping 1006 of data values to key functions of the new device being defined.

In one exemplary embodiment, a terminating keystroke, for example activation of the "Setup" key 214, may be entered at any time during the mapping process. When this is encountered, controlling device 100 exits the device definition state to resume normal operation. It will be understood that, in such a case, the newly defined device will include only the key functions that were mapped prior to exiting the state and any unmapped keys will remain non-functional. Truncation of the key mapping sequence in this manner may be used advantageously to reduce the number of user keystrokes required where only a subset of the available command functions need to be defined. For example, the user of a universal controlling device supplied together with a cable set top box, when configuring the TV mode of that controlling device for use in conjunction with that STB may only be interested in a limited number of functions, e.g. power and volume control only. To this end, it will be appreciated that the key order sequence 1010 maintained by the programming of the controlling device 100 may be adjusted in various controlling devices 100 to place the most desired, i.e., most likely to be setup, functions early in the mapping entry sequence, according to the intended application of the controlling device. It will be further appreciated that in certain applications different key order sequences may be used for different device types, for example, when defining a DVD device it may desirable to place the transport control and menu functions ahead of the digit and channel changing keys, while the opposite may be true when defining a television device.

In the case of outcome (3) above, i.e., where no suitable reference device was located by the search, an explicit definition of command function values will be required. In this instance, a pre-defined reference device number in the header block, for example $7FF_H$ may be use to indicate to the recipient controlling device that special processing is to be performed on the data that follows. In the simplest method, the desired byte values that will define the command function values may be directly entered as hexadecimal values by activating keys in the manner described above. However this approach, while functional, will typically require two keystrokes per value being defined, e.g., to provide to the controlling device the first and second hexadecimal digits of the byte value being defined. Accordingly, in order to reduce the number of user keystrokes, an exemplary embodiment of the instant invention utilizes a "virtual" reference device which can be thought of as containing every possible byte value from 00 to $FF_H$ and is accessed using a method which will be referred to hereafter as "dynamic indexing." Dynamic indexing takes advantage of the fact that in many command code sets, the data values for groups of functions tend to be assigned sequentially rather than completely randomly. For example, the data values for use in digit function transmissions, i.e., 0 through 9, often form an arithmetic sequence, as do the digit values for navigation functions, transport functions, etc. (as practically illustrated in the reference device table 1004 of FIG. 10). Thus, using this knowledge, when assigning a value to an individual function it may be assumed that the most probable value for the next function to be assigned is likely not very distant in sequential terms from the value of the function presently being assigned.

Figure 11:
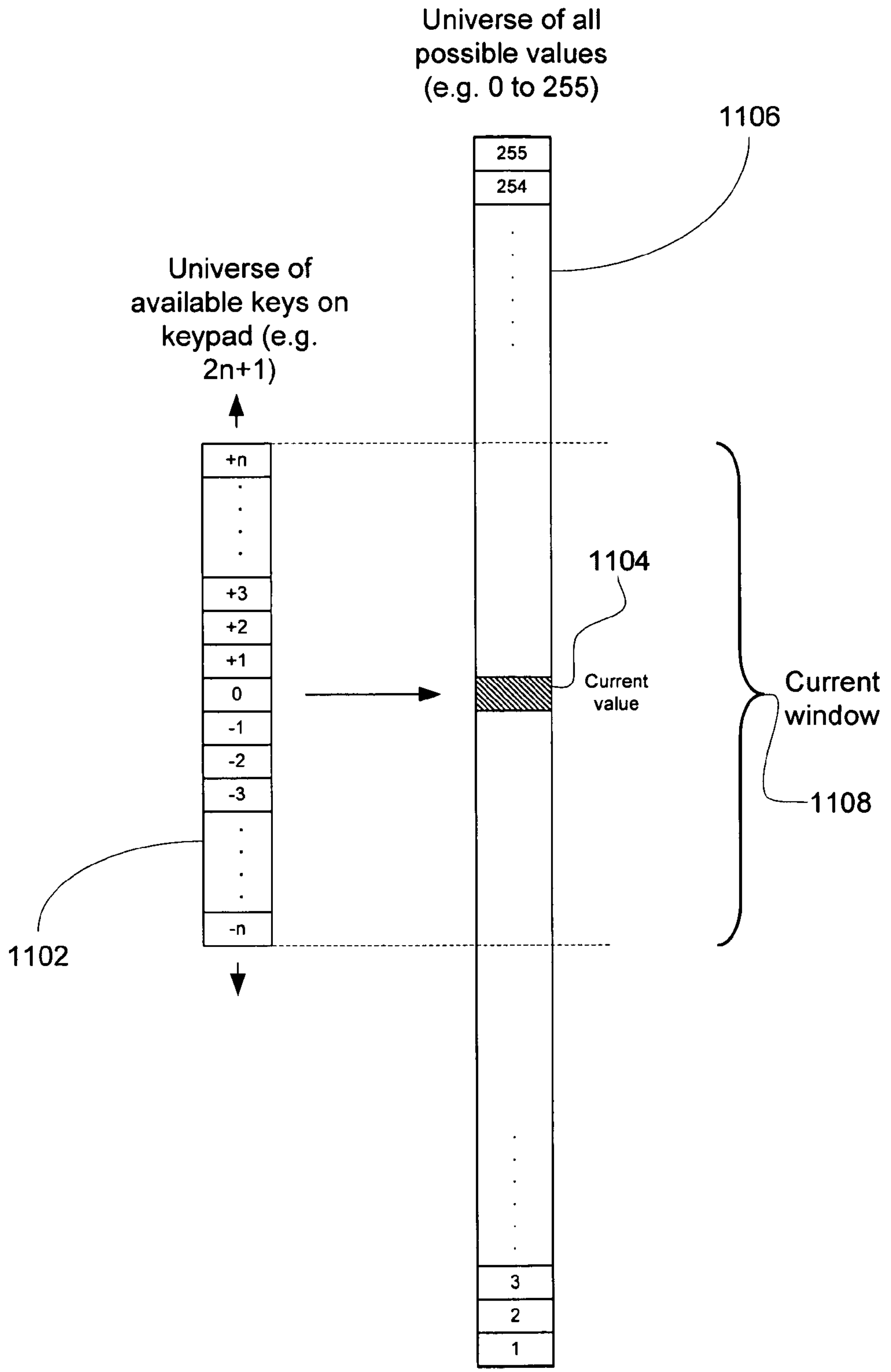
FIG. 11 illustrates an exemplary method for dynamically indexing into a virtual table of byte values for use in mapping function data values from the virtual table onto an exemplary new device being defined for the exemplary controlling device of FIG. 2.

More particularly and as illustrated in FIG. 11, dynamic indexing splits the universe of available keys 1102 on the key matrix of a controlling device into two groups wherein half of the keys are assigned by the programming of the controlling device 100 to be used to select a value which is a positive incremental distance from a current value 1104 in a universe of possible values 1106 (256 in this example) and the other half of the keys are assigned by the programming of the controlling device 100 to be used to select a value which is a negative incremental distance from current value 1104 in the universe of possible values 1106. In keeping with this methodology, each time a new value is selected for inclusion in the new device data table being defined by activation of one of the keys, that value becomes the new current value, i.e. the "window" 1108 representing the span of the available keys is logically repositioned by the programming of the controlling device 100 so the "window" always remains centered on the last value used. The likelihood that next value needed is within the "window," i.e., the span reachable by only one keystroke, is thus maximized. Since the desired value may not always be within range of a single keystroke, two of the keys on the keypad (for example CH+ and CH−) may be reserved for moving "window" 1108 an entire block up or down relative to the universe of all possible values 1106 if necessary.

Figure 12:
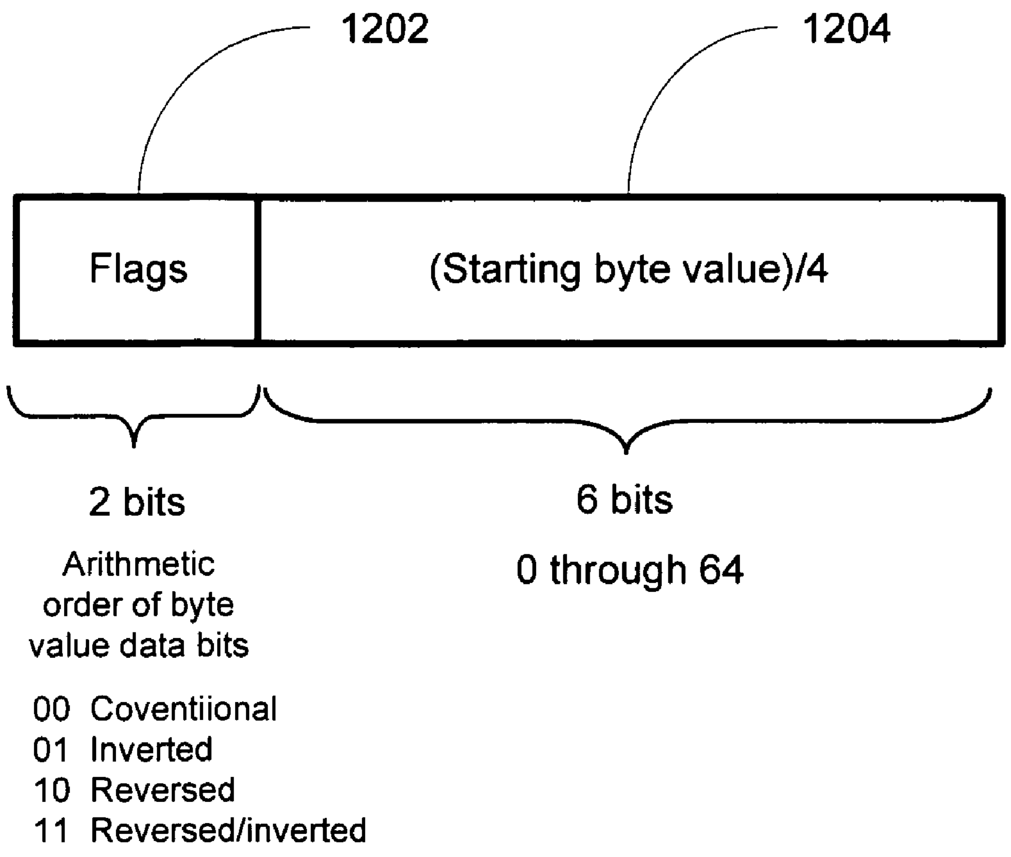
FIG. 12 illustrates an exemplary initialization data byte for an exemplary index utilizing the dynamic indexing method of FIG. 11.

In practice, there is no need for an actual physical table of 256 byte values to be stored by a controlling device implementing this algorithm—since each value is always calculated from the previous one, all that actually needs to be maintained in the memory of the controlling device is a single byte representing the current value. Hence the concept of a "virtual" reference. It will also be appreciated that, in practice, the illustrated algorithm will require two items of initialization information: (1) where the "window" should be placed to begin with, i.e. a starting current value upon which the "window" is to be centered; and (2) because the bit order and significance of appliance command code assignments used by various manufacturers differs, whether the expected arithmetic progression should be based on a conventional or a reversed bit order in each byte and/or conventional or inverted bit values. As further illustrated in FIG. 12, this information may, for example, be encoded in a single header byte in which two bits 1202 may be used as illustrated to indicate the desired arithmetic progression, and six bits may be used to designate a starting value, modulo four. It will also be appreciated that since the first selection key input will automatically "center the window," in general the starting value need only be accurate to within (N−1)/2 positions, where N is the number of available keys. Accordingly, in other embodiments fewer bits may be used to delineate the starting position.

Figure 15:
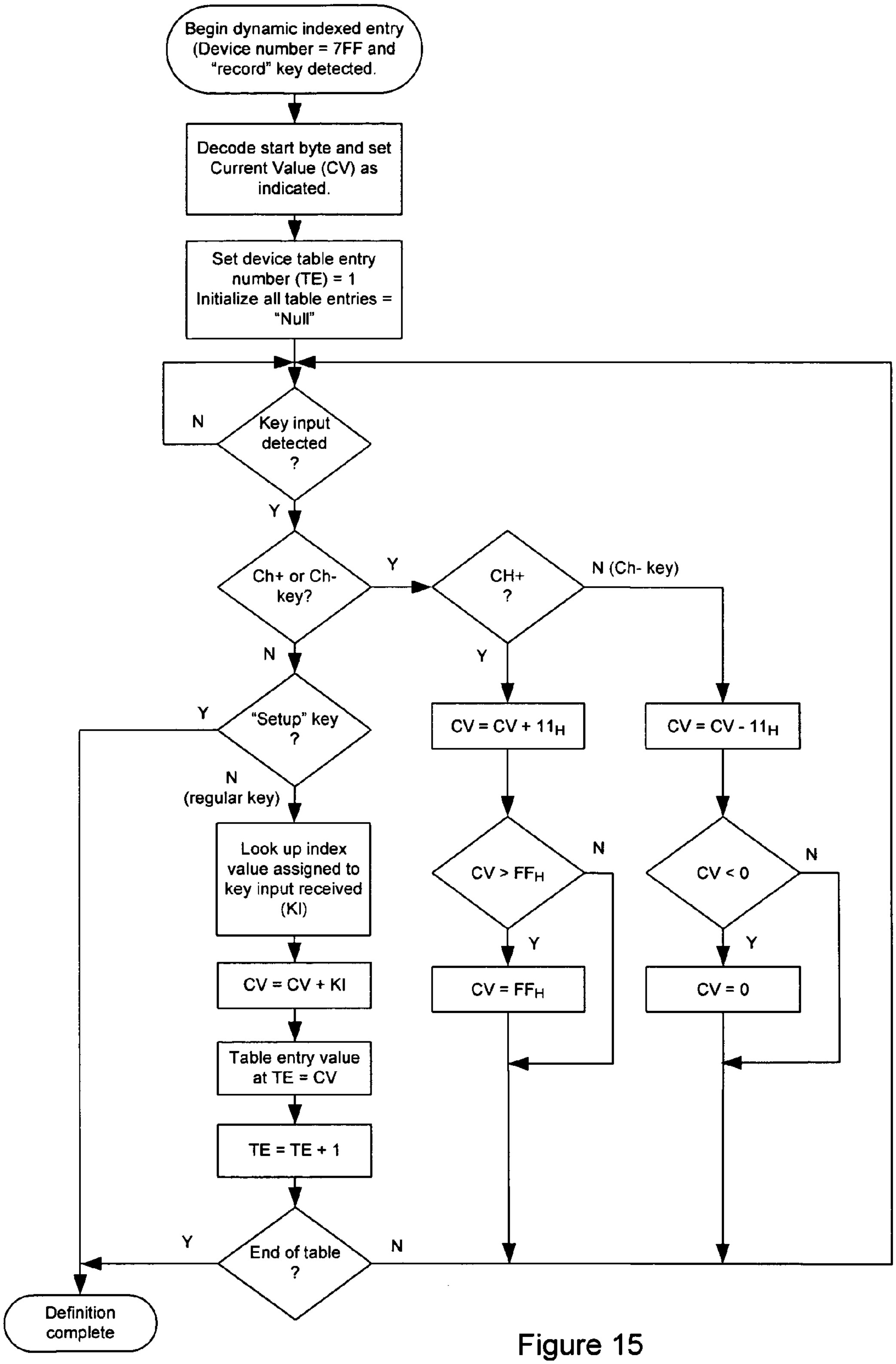
FIG. 15 illustrates in flow chart form an exemplary series of steps involved in processing a series of data values represented in dynamic index form.

By way of more detailed example, FIG. 13 illustrates an exemplary process of defining a new device data table using dynamic indexing into a virtual reference. Excepting only Ch+ (used to reposition the window upward), Ch− (used to reposition the window downward), and Setup (used to exit the current configuration mode), the keys 1302 of a controlling device 100 key matrix 316 are assigned increment/decrement values 1302 as shown. In the illustrated example, the current byte value 1306 is $1A_H$ corresponding to the data value which has just been assigned to the Vol+ function 1308 of the device data table under construction 1310. If, for example, the next three data values to be assigned are $1B_H$, $1C_H$, and $28_H$ corresponding to the next functions in the entry sequence 1312 to be defined, that is entries 13, 14 and 15 mapped to the keys Vol−, Mute, and Chan+, respectively, the next three keypad entries to achieve this would be (to assist in following the logical steps of this process as described in the following paragraphs, reference may be made to the flowchart of FIG. 15):

"Stop" 1320, e.g. key 218 of controlling device 100, to increment current byte value ($1A_H$) by 1 to $1B_H$, store that value at table entry number 13 and update current byte value to $1B_H$;

"Stop" 1320 again to increment current byte value ($1B_H$) by 1 more to $1C_H$, store that value at table entry number 14 and update current byte value to $1C_H$;

"Enter" 1322, e.g. key 220 of controlling device 100, to increment current byte value ($1C_H$) by C to $28_H$, store that value at table entry number 15 and update current byte value to $28_H$.

Key entry may continue in this fashion until all desired device data table values have been defined. As before, the entry may be terminated at any time by activation of the "setup" key 214, enabling only the first portion of new device data table 1310 to be defined if so desired.

In a related alternative method which may be embodied either in conjunction with those described above or as a separate feature, a special device table and protocol definition may be provided in a controlling device, which table and protocol dynamically base all or a part of the system code value(s) to be transmitted on the configuration information initially entered into the controlling device by the user to identify the intended target appliance. In this manner, provision may be made for future members of a family of appliances which share similar function command values and transmission format and are differentiated only by system code—such as for example a series of appliances of different types from the same manufacturer, or a series of appliances of the same type which are all private labeled from the same original equipment manufacturer.

Figure 16:
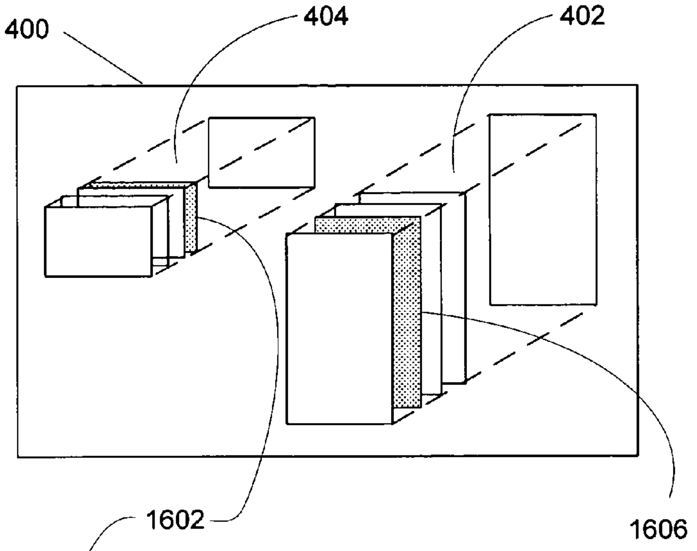
FIG. 16 illustrates an exemplary method of assigning system codes to command code data sets based on the device identification data that was provided during setup.

By way of more detailed example, with reference to FIG. 16, a block of device data set numbers (e.g., conventionally entered user-entered setup numbers as described in U.S. Pat. No. 4,959,810) may be reserved for this purpose, for example the numbers 1760 through 1791 corresponding to hexadecimal values $6E0_H$ through $6FF_H$. When a user of controlling device 100 enters a number in this range during the setup process (using any convenient method, for example that described in U.S. Pat. No. 5,872,562) the operating program may store this value in the usual manner in a table of device assignments 1620, located for example in non-volatile memory 306. During normal operation, when a function key is activated and the operating software determines that the setup number 1622 corresponding to the device mode state currently in use ("VCR" in the illustrated example) is within this reserved range, it recognizes that all such setup codes refer to the same basic device table 1606. Device table 1606 in turn, references 1608 a protocol definition 1602 in which the system code value to be transmitted as one element of the command data frame is calculated based partially on the system code 1610 stored in basic device table 1606, and partially on the exact setup code number 1622 that was originally input by the user. In the illustrated example, it may be seen that the particular algorithm used 1614 comprises adding the value represented by the low order five bits of the setup code 1622 to the base value 1610 from the device table. Thus the illustrated exemplary set up code number $6F3_H$ (corresponding to a user-entered decimal number of 1779) is ANDed with $1F_H$ to produce a value of $13_H$ which is then added to the base value 1610 ($060_H$) to produce a system code of $073_H$ which may be used in command transmissions to the controlled device. In this manner, up to thirty two separate system codes may be generated from the same basic device table, depending only on the setup number which was used to identify the device to be controlled. It is to be appreciated however that the above exemplary embodiment is not limiting: many other algorithms may be applied with equally effectiveness in the implementation of such a feature.

Once a keystroke sequence, such as for example key sequence 950, has been determined for entry into remote control 100 using any of the above described methods, it will be appreciated that various presentation techniques and methodologies may be implemented to ensure that a user is able to correctly and without undue frustration enter the sequence into the remote control to effect setup of the new appliance 106. In this regard it is contemplated that in addition to the ability to simply present the actual string of keystroke data to the user by way of a computer screen, television, email, or telephonically, for certain devices having the ability to receive and interpret command data being sent by the subject remote control (e.g., STB 104 or other appliance with which the remote control is currently configured to communicate), an automated data entry process can be used to ensure accurate keystroke entry by the user. Generally, a device such as STB 104 or other appliance having both access to a server for performing match and keystroke generation functions (such as those described in connection with FIG. 5B) and an appropriate receiver for receipt of command data from remote control 100 may be configured with programming to implement an automated keystroke entry and verification process as follows. The keystroke data may be presented to the user (typically via a television 102 or other display interface connected to the STB) either as a complete string, or sequentially in response to keystrokes entered by the user, e.g., one keystroke at a time. In either case, programming on STB 104 and/or remote control 100 may be provided such that entry of keystroke data into the memory of remote control 100 is not completely effected without verification that keystroke data was entered correctly from STB 104. By way of example, if a user were presented key sequence 950 by the STB, he would first press the "2" button on the remote control. Programming on remote control 100 could be configured to both temporarily store the data corresponding to the "2" key in memory for purposes of effecting setup of new appliance 106, and also transmitting the command code data typically associated with operation of the "2" key to STB 104 for verification purposes. Upon receipt of the command code data corresponding to the "2" key, programming on STB 104 may indicate to the user that the key was entered correctly, either via a visual, audible, or other user cue, which may for example be presented on the television 102 or other display interface connected to the STB, and may further present the next keystroke in the sequence, if any. If on the other hand the "2" key was entered incorrectly the programming on STB 104 would indicate to the user (via user cues) that the previous keystroke was incorrect. A "backup" or "erase" key or similar functionality may be provided on remote control 100 during such setup procedures such that STP 104 may instruct the user to delete incorrectly entered keystrokes (activation of which backup or erase key may itself be monitored by STB 104 by way of further verification). In this way it will be appreciated that a user may be caused to advance through a keystroke sequence of any length or complexity with minimal errors or potential frustrations with loosing one's place during a keystroke entry process as contemplated in the present invention. While a STB and the controlling device may have the ability to exchange communications whereby the STB can function to send verification commands back to the controlling device 100 that a key was correctly activated in the sequence, to automatically erase, delete, or otherwise cause incorrectly entered keystroke data to not be used during the setup procedure, etc., in the case where the STB and the controlling device 100 do have the ability to exchange communications it may be more desirable to use these capabilities to download the data represented by the entirety of the keystroke sequence from the STB to the controlling device 100 via the communication link.

While various concepts have been described in detail, it will be appreciated by those skilled in the art that various modifications and alternatives to those concepts could be developed in light of the overall teachings of the disclosure. For example, while one disclosed exemplary embodiment contemplates delivery of device definition key sequences via the Internet or similar interactive electronic means, it will be appreciated that in alternative embodiments these may be delivered to a customer verbally over the telephone by a service representative or an automated dial-in service, mailed to a customer either electronically or by way of the postal service, published on a community bulletin board, electronic or otherwise, distributed as a user manual supplement, etc., all without departing from the spirit of the invention. Furthermore, it will be appreciated that while various exemplary methods for representing and storing controlled device command data are presented herein, many alternative representations may be possible and utilizable in practice. For example system codes may be made part of a protocol definition, carrier pulses may be defined in terms of period rather than frequency and duty cycle, burst data may be defined in terms of numbers of carrier cycles rather than times, command functions may be represented by fewer or more than 8 bits of data, etc., without limitation, and all without departing from the spirit of the described invention.

Further, while various aspects of this invention have been described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and interrelationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A computer-storage medium having stored thereon computer executable instructions for use in connection with a process for defining within a controlling device a controlled device data set for use in generating command codes, each comprised of plural, combined command code data elements, for commanding operations of an intended target appliance, the instructions performing steps comprising:

receiving input used to identify the controlling device;

receiving input used to identify the intended target appliance;

using the identity of the controlling device and the identity of the intended target appliance to discern matches between command code data elements within a library of device data sets known to be stored in the controlling device and command code data elements within a device data set appropriate for use in generating command codes for commanding operations of the intended target appliance; and creating a definition which, when provided to the controlling device, will allow the controlling device to transmit new command codes to command operations of the intended target appliance through use of a combination of those command code data elements within the library of device data sets known to be stored in the controlling device which have been discerned to match command code data elements within the device data set for use in generating command codes for commanding operations of the intended target appliance.

2. The computer-storage medium as recited in claim 1, wherein creating the definition comprises defining a sequence of key presses to be entered via keys of a key matrix of the controlling device, the sequence of key presses functioning to identify to the controlling device the command code data elements within the library of device data sets stored within the controlling device which are to be combined and used when generating the new command codes for commanding operations of the intended target appliance.

3. The computer-storage medium as recited in claim 2, wherein the defined sequence of key presses functions to identify to the controlling device function command code data elements in the form of data values which are to be used when generating the new command codes for commanding operations of the intended target appliance.

4. The computer-storage medium as recited in claim 3, wherein the defined sequence of key presses functions to identify command code data elements in the form of function data values within a virtual table having a defined set of function data values.

5. The computer-storage medium as recited in claim 1, wherein the instructions discern a match between a command code data element in the form of a protocol definition know to be stored within the controlling device and a protocol definition appropriate for use in generating the new command codes for commanding operations of the intended target appliance.

6. The computer-storage medium as recited in claim 1, wherein the instructions discern a match between a command code data element in the form of a system address known to be stored within the controlling device and a system address appropriate for use in generating the new command codes for commanding operations of the intended target appliance.

7. The computer-storage medium as recited in claim 1, wherein the instructions discern a match between command code data elements in the form of function data known to be stored within the controlling device and function data appropriate for use in generating the new command codes for commanding operations of the intended target appliance.

8. The computer-storage medium as recited in claim 1, wherein the input used to identify the controlling device is received via a wide area network.

9. The computer-storage medium as recited in claim 1, wherein the input used to identify the intended target appliance is received via a wide area network.

10. The computer-storage medium as recited in claim l, wherein the instructions perform the step of providing the created definition in a form that allows for manually entry of the definition into the controlling device.

11. The computer-storage medium as recited in claim 1, wherein the instructions perform the step of providing the created definition in a form that allows for the downloading of the definition into the controlling device.

12. A system for configuring a controlling device to allow the controlling device to command operations of an intended target appliance by means of command codes each comprised of plural, combined command code data elements, comprising:

a server having programming for receiving input used to identify the controlling device; receiving input used to identify the intended target appliance; using the identity of the controlling device and the identity of the intended target appliance to discern matches between command code data elements within a library of device data sets known to be stored in the controlling device and command code data elements within a device data set appropriate for use in generating command codes for commanding operations of the intended target appliance; and creating a definition which, when provided to the controlling device, will allow the controlling device to transmit new command codes to command operations of the intended target appliance through use of a combination of those command data code elements within the library of device data sets known to be stored in the controlling device which have been discerned to match command code data elements within the device data set for use in generating command codes for commanding operations of the intended target appliance; and programming resident on the controlling device for accepting the definition and using the definition to identify the command code data elements within the library of device data sets stored with the controlling device which are to be combined and used when generating the new command codes for commanding operations of the intended target appliance.

13. The system as recited in claim 12, wherein the definition comprises a sequence of key presses to be entered via keys of a key matrix of the controlling device.

14. The system as recited in clam 12, wherein the sequence of key presses functions to identify to the controlling device command code data elements in the form of function data values which are to be used when generating the new command codes for commanding operations of the intended target appliance.

15. The systems recited in claim 14, wherein the sequence of key presses functions to identify command code data elements if the form of function data values within a virtual table having a defined set of function data values.

16. The system as recited in claim 12, wherein the programming of the server discerns a match between a command code data element in the form of a protocol definition know to be stored within the controlling device an a protocol definition appropriate for use in generating the new command codes for commanding operations of the intended target appliance.

17. The system as recited in claim 12, wherein the programming of the server discerns a match between a command code data element in the form of a system address known to be stored within the controlling device and a system address appropriate for use in generating the new command codes for commanding and in operations of the intended target appliance.

18. The system as recited in claim 12, wherein the programming of the server discerns a match between command code data elements in the form of function data known to be stored within the controlling device and function data appropriate for use in generating the new command codes for commanding operations of the intended target appliance.

19. The system as recited in claim 12, wherein the input used to identify the controlling device is received at the server via a wide area network.

20. The system as recited in claim 12, wherein the input used to identify the intended target appliance is received at the server via a wide area network.

21. The system as recited in claim 12, wherein the programming of the server functions to provide the created definition in a form that allows for manually entry of the definition into the controlling device.

22. The system as recited in claim 12, wherein the programming of the server functions to provide the created definition in a form that allows for the downloading of the definition into the controlling device.

23. A computer-storage medium having stored thereon computer-executable instructions for defining within a controlling device anew device data set for use in generating new command codes, each comprised of plural, combined command code data elements, for commanding operations of an intended target appliance, the instructions performing steps comprising:

accepting input of a definition; and using the definition to combine previously uncombined command code data elements selected from device data sets within a library of device data sets stored within a memory of the controlling device to form the new device data set which new device data set is to be used when generating the new command codes for commanding operations of the intended target appliance.

24. The computer-storage. medium as recited in claim 23, wherein the instructions store at least a portion of the new device data set in the memory of the controlling device.

25. The computer-storage medium as recited in claim 23, wherein the instructions use the definition in response to activation of a key of a key matrix of the controlling device when activation of the key is intended to control an operation of the intended target appliance.

26. The computer-storage medium as recited in claim 23, wherein the input comprises a sequence of the key presses to be entered via keys of a key matrix of the controlling device.

27. The computer-storage medium as recited in claim 26, wherein the instructions use at least a portion of the sequence of key presses to identify command code data elements in the form of specific function data values within the library of device data sets which are to be used when generating the new command codes for commanding operations of the intended target appliance.

28. The computer-storage medium as recited in claim 27, wherein the instructions use at least a portion of the sequence of key presses to identify a command code data element in the form of a protocol definition within the library of device data sets for use in generating the new command codes for commanding operations of the intended target appliance.

29. The computer-storage medium as recited in claim 27, wherein the instructions use at least a portion of the sequence of key presses to identify a command data code element if the form of a system address for use in generating the new command codes for commanding operations of the intended target appliance.

30. The computer-storage medium as recited in claim 23, wherein the input is manually provided to the controlling device.

31. The computer-storage medium as recited in claim 23, wherein the input is downloaded via downloading hardware into the controlling device.

32. A controlling device for generating command codes, each comprised of plural, combined command code data elements, for commanding operations of an intended target appliance, comprising:

a memory in which is stored a library of device data sets; and programming for using a definition input into the controlling device to combine previously uncombined command code data elements selected from device data sets within the library of device data sets stored within the memory of the controlling device to form a new device data set which new device data set is to be used when generating new command codes for commanding operations of the intended target appliance.

33. The controlling device as recited in claim 32, wherein the programming stores at least a portion of the new device data set in the memory of the controlling device.

34. The controlling device as recited in claim 33, wherein the programming uses the definition in response to activation of a key of a key matrix of the controlling device when activation of the key is intended to control an operation of the intended target appliance.

35. The controlling device as recited in claim 33, wherein the definition comprises a sequence of key presses entered via keys of a key matrix of the controlling device.

36. The controlling device as recited in claim 35, wherein the programming uses at least a portion of the sequence of key presses to identify command code data elements in the form of specific function data values within the library of device data sets which are to be used when generating the new command codes for commanding operations of the intended target appliance.

37. The controlling device as recited in claim 35, wherein the programming uses at least a portion of the sequence of key presses to identify a command code data element in the form of a protocol definition within the library of device data sets for use in generating the new command codes for commanding operations of the intended target appliance.

38. The controlling device as recited in claim 35, wherein the programming uses at least a portion of the sequence of key presses to identify a command code data element in the form of a system address for use in generating the new command codes for commanding operations of the intended target appliance.

39. The controlling device as recited in claim 32, comprising hardware for accepting the definition for download into the controlling device.

40. A method for defining a device data set for use by a controlling device to generate command codes, each comprised of plural, combined command code data elements, for commanding operations of an intended target appliance, comprising:

receiving input into the controlling device which functions to select from a reference device data set a command code data element in the form of a command function data value;

storing the selected command function data value in a new device data set stored within the memory of the controlling device, wherein the selected command function data value is mapped to a key within a key matrix of the controlling device; and causing the controlling device in response to actuation of the key to use the selected command function data value as one of the plural, combined command code data elements to be used when generating a new command code for commanding operations of the intended target appliance.

41. The method as recited in claim 40, wherein the reference device data set comprises a data set preprogrammed into the controlling device.

42. The method as recited in claim 40, wherein the reference device data set comprises a virtual reference device data set having a predetermined universe of values.

43. The method as recited in claim 42, wherein the input comprises a first activation of a key of the key matrix of the controlling device and a second activation of a key of the key matrix of the controlling device and the method comprises using the first activation of a key of the key matrix to position a window relative to the reference device data set and using the second activation of a key of the key matrix and the position of the window relative to the reference device data set to select from the reference device data set the command code data element in the form of the of the command function data value.

44. The method as recited in claim 43, comprising using the second activation of a key of the key matrix to reposition the window relative to the reference device data set for use in selecting a further command code data element in the form of a further command function data value from the reference device data set for storage in the new device data set in response to a third activation of a key of the key matrix.

45. A controlling device for commanding operations of an intended target appliance by means of command codes each comprised of plural, combined command code data elements, comprising:

a memory in which is stored a library of device data sets each device data set comprising a combination of command code data elements in the form of a protocol definition, a system code, and a plurality of command function data values which are used by the controlling device to transmit new command codes to command operations of appliances; and programming for accepting input that is used by the controlling device to select one of the device data sets from the library of device datasets as a device data set to be used to command operations of the intended target appliance and which is further used by the controlling device to modify the system code command code data element of the selected device data set when the controlling device is used to transmit the new command codes to command operations of the intended target appliance.

46. The system as recited in claim 45, comprising a device having an associated display in communication with the server which receives from the server data where the device uses the data received by the server to present on the display the sequence of key presses to be entered via keys of the key matrix of the controlling device.

47. The system as recited in claim 46, wherein the device is adapted to receive signals transmitted from the controlling device and the controlling device is adapted to transmit a signal which includes data from which the device may discern which key of the key matrix of the controlling device was activated to cause transmission of the signal and wherein the device determines from signals received from the controlling device if keys of the key matrix of the controlling device are being activated in keeping with the sequence of key presses.

48. The system as recited in claim 47, wherein the device generates a signal to signify to a user that a key of the key matrix of the controlling device was not activated in keeping with the sequence of key presses.

49. The system as recited in claim 48, wherein the controlling device has programming which includes a setup mode for accepting the definition, for temporarily storing a key press entered during the setup mode, and for allowing the user to either replace the temporarily stored key press with a further temporarily stored key press entered during the setup mode or to accept the temporarily stored key press as being a part of the definition.

50. The system as recited in claim 47, wherein the device generates a signal to signify to a user that a key of the key matrix of the controlling device was activated in keeping with the sequence of key presses.

51. The system as recited in claim 50, wherein the controlling device has programming which includes a setup mode for accepting the definition, for temporarily storing a key press entered during the setup mode, and for allowing the user to either replace the temporarily stored key press with a further temporarily stored key press entered during the setup mode or to accept the temporarily stored key press as being a part of the definition.

52. The system as recited in claim 47, wherein the device displays a next key press in the sequence of key presses in response to the device receiving a signal which indicates that a key of the key matrix which corresponds to a key press in the sequence of key presses which precedes the next key press in the sequence of key presses was activated.

* * * * *